(12) United States Patent
Makino et al.

(10) Patent No.: US 7,791,655 B2
(45) Date of Patent: Sep. 7, 2010

(54) IMAGING APPARATUS WITH FUNCTION OF SHADING COMPENSATION

(75) Inventors: Tetsuji Makino, Ome (JP); Keiichi Sakurai, Akisihima (JP)

(73) Assignee: Casio Computer Co., Ltd., Tokyo (JP)

( * ) Notice: Subject to any disclaimer, the term of this patent is extended or adjusted under 35 U.S.C. 154(b) by 377 days.

(21) Appl. No.: 11/899,376

(22) Filed: Sep. 5, 2007

(65) Prior Publication Data
US 2008/0111903 A1 May 15, 2008

(30) Foreign Application Priority Data

Sep. 6, 2006 (JP) ............................. 2006-240945
Jun. 25, 2007 (JP) ............................. 2007-166062

(51) Int. Cl.
*H04N 9/64* (2006.01)
*H04N 5/228* (2006.01)

(52) U.S. Cl. .................................. 348/251; 348/208.6
(58) Field of Classification Search ................. 348/241, 348/251, 335, 340, 302, 311, 222.1, 229.1, 348/208.6, 295, 296, 297, 298, 362, 367
See application file for complete search history.

(56) References Cited

U.S. PATENT DOCUMENTS

| 5,365,269 | A | * | 11/1994 | Holmes et al. | ............... | 348/297 |
| 7,190,845 | B2 | * | 3/2007 | Iida | ............... | 382/274 |
| 2004/0239775 | A1 | * | 12/2004 | Washisu | ............... | 348/239 |
| 2005/0099509 | A1 | * | 5/2005 | Kobayashi | ............... | 348/229.1 |
| 2007/0014554 | A1 | | 1/2007 | Sasaki et al. | | |
| 2007/0285526 | A1 | * | 12/2007 | Mann et al. | ............... | 348/222.1 |

FOREIGN PATENT DOCUMENTS

| JP | 2001-326850 A | 11/2001 |
| JP | 2002-296685 A | 10/2002 |
| JP | 2003-289474 A | 10/2003 |
| JP | 2005-182098 A | 7/2005 |
| JP | 2006-180429 A | 7/2006 |

OTHER PUBLICATIONS

Japanese Office Actiion (and English translation thereof) dated Nov. 21, 2008, issued in a counterpart Japanese Application.

* cited by examiner

*Primary Examiner*—Jason Chan
*Assistant Examiner*—Nicholas G Giles
(74) *Attorney, Agent, or Firm*—Frishauf, Holtz, Goodman & Chick, P.C.

(57) ABSTRACT

A photographing unit photographs an object "n" times respectively with exposure times $T1(1)$ to $T1(n)$ to generate "n" sheets of images of the same object per an exposure time $T1$, where "n" is a whole number and the exposure times $T1(1)$ to $T1(n)$ are obtained by dividing the exposure time $T1$ by the whole number of "n", a displacement correcting unit (32a, 32b) calculates a correction value for correcting displacement of the images, and a limb-darkening compensating unit (32d) corrects a position of a limb-darkening characteristic component of each of the images, using the correction value. Meanwhile, the limb-darkening characteristic components of the images whose positions have been corrected are combined to generate a limb-darkening characteristic component for compensation. Limb darkening in a combined image is compensated for, using the limb-darkening characteristic component for compensation, whereby a time required for performing a limb-darkening compensating process is decreased.

14 Claims, 18 Drawing Sheets

FIG.3
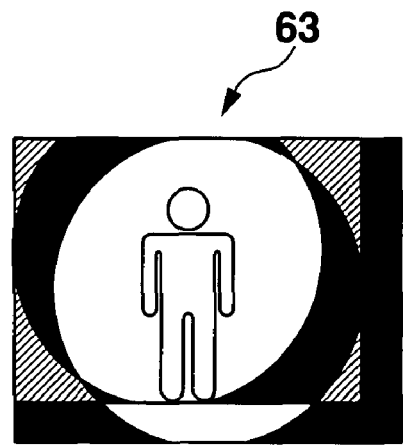
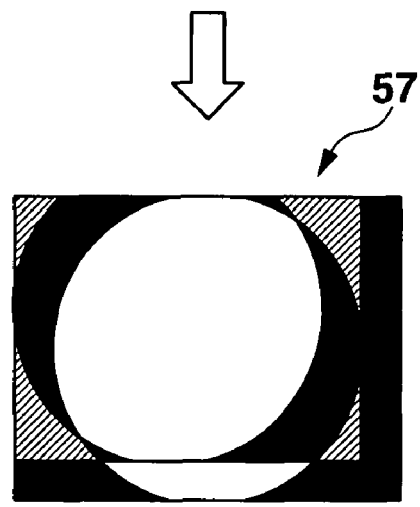
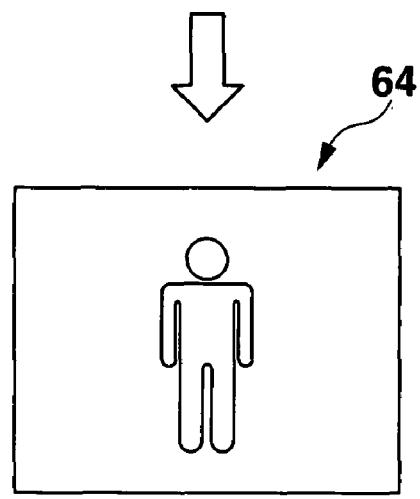

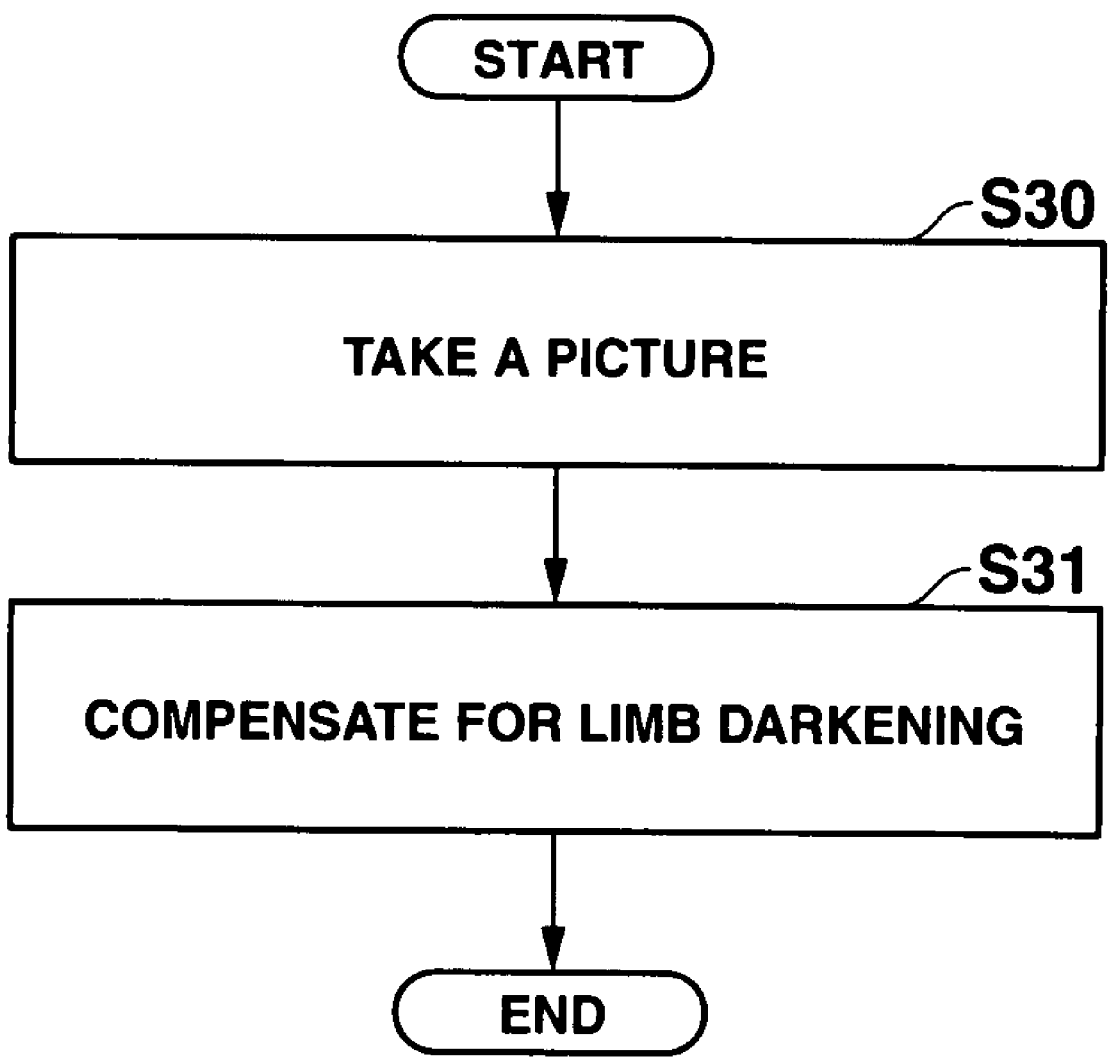

COORDINATE

COORDINATE

IMAGING APPARATUS WITH FUNCTION OF SHADING COMPENSATION

BACKGROUND OF THE INVENTION

1. Field of the Invention

The present invention relates to an imaging apparatus, a method of shooting an object and a computer program product, and more specifically, to an image apparatus, a method of shooting an object and a computer program product, which are used suitably, for instance, in digital cameras and the like for obtaining photographs having good image quality even when shooting with a long exposure time.

2. Description of the Related Art

FIG. 12 is a view showing a general idea of the a first conventional technique disclosed in Japanese Patent Application 2001-326850A.

In FIG. 12, T1 denotes an exposure time for shooting an object under low light conditions where it is prohibited to use a strobe light.

The exposure time T1 is an exposure time that is longer than an appropriate time for shooting under good light conditions.

In the first conventional technique, an image signal is read out from the two-dimensional image sensor several times during the exposure time T1.

For instance, the exposure time T1 is evenly divided into four exposure times, $T1_{(1)}$ to $T1_{(4)}$, as shown in FIG. 12, and images are read out from the image sensor respectively in four exposure times $T1_{(1)}$ to $T1_{(4)}$. Note that the exposure time T1 is not always divided evenly but may be simply divided into plural exposure times.

Finally, these four images 1 to 4 are combined together to produce one image signal 5. In FIG. 12, sizes of four images 1 to 4 are different from the combined image 5, but the image 5 is drawn larger than other images 1 to 4 for the sake of explanation. In practice, the four images 1 to 4 have the same size as the combine image 5.

In a system of combining plural images into one image, the exposure time ($T1_{(1)}$ to $T1_{(4)}$) for each of the images 1 to 4 is obtained by dividing the exposure time T1 by 4, where the exposure time T1 is an exposure time for shooting an object under low light conditions where it is prohibited to use the strobe light. Therefore, when the exposure time ($T1_{(1)}$ to $T1_{(4)}$) for the images 1 to 4 is obtained by dividing the exposure time T1 evenly, brightness of the images 1 to 4 would have been one fourth of target brightness.

When the exposure time T1 is divided evenly for each of the images 1 to 4, brightness of the image 5 obtained by combining these four images 1 to 4 corresponds to approximately four times of brightness of each of the images 1 to 4. As a result, an image (combined image 5) can be obtained, of a predetermined brightness corresponding to the exposure time for shooting an object under low light conditions where it is prohibited to use the strobe light.

A dark current component (a level of which is assumed to be "P" for convenience) contained in the combined image 5 corresponds approximately to the total ($\approx P_{(1)} + P_{(2)} + P_{(3)} + P_{(4)}$) of dark current components (levels of which are assumed to be $P_{(1)}$, $P_{(2)}$, $P_{(3)}$ and $P_{(4)}$ respectively for convenience) contained in each of the images 1 to 4.

As described above, the dark current is a sort of sensor noises that increase exponentially with exposure time.

Assuming that a dark current component having a level of P' is contained in one image photographed with the exposure time T1, "P'>P" will be true. Therefore, the dark current component "P" contained in the combined image 5 can be decreased, whereby the image photographed with a long exposure time is improved in image quality.

The first conventional technique mentioned above has advantages in improving image quality of an image photographed with a long exposure time. But on the contrary the first conventional technique has disadvantages that cannot solve problems caused due to camera shake, which occurs frequently.

Japanese Patent Application 2005-182089 A describes a technique (hereinafter, a "second conventional technique") which takes measures for camera shake.

FIGS. 13A and 13B are views illustrating an idea of the second conventional technique.

In FIG. 13A, four images 6 to 9 correspond respectively to the images 1 to 4 obtained in the first conventional technique as shown in FIG. 12. In FIG. 13B, an image 10 corresponds to the combined image 5 in the first conventional technique as shown in FIG. 12.

The second conventional technique is different from the first conventional technique in that objects (persons) of four images 6 to 9 are shifted in position a little from each other in the images.

More specifically, when compared with the position of the person 11 in the first image 6, the person 12 of the second image 7 is shifted in position a little to the right by an amount of F1 as shown in the image 7 of FIG. 13A.

Further, when compared with the position of the person 12 in the second image 7, the person 13 of the third image 8 is shifted in position a little to the right by an amount of F2 as shown in the image 8 of FIG. 13A.

Similarly, when compared with the position of the person 13 in the third image 8, the person 14 of the fourth image 9 is shifted in position a little to the right by an amount of F3 as shown in the image 9 of FIG. 13A.

The persons 11 to 14 appearing in the four images 6 to 9 are the same person, and therefore these four images indicate that the camera are shaken in the leftward while these images are photographed.

The second conventional technique has been described with respect to the camera which has been shaken in the horizontal direction. The second technique can be applied to the camera which has been shaken not only in the horizontal direction but also in the vertical direction or in the other direction.

In the second conventional technique, feature points of edges and feature points of hue are extracted from each of the four images 6 to 9, and the extracted feature points are checked to specify common feature points.

Plural feature points common to these images 6 to 9 are calculated to determine their relative positions, and relative positions of the images 6 to 9 are determined based on the determined relative positions of the feature points. Then, positions of the four images 6 to 9 are corrected based on the determined relative positions of the four images 6 to 9 to combine the four images together, thereby generating one combined image 10.

In short, movement or displacement between two images which are adjacent in terms of time is detected and then the detected movement or displacement is corrected to generate the combined image 10.

As described above, the second conventional technique solves problems caused due to camera shake by correcting the movement or displacement between images adjacent in terms of time.

And further, dark current components contained in the combined image 10 is reduces, whereby an image photographed with a long exposure time is improved in quality.

However, the second conventional technique has another disadvantages that it takes a long time to compensate for limb darkening of an optical system, as described below.

FIG. 14 is a view illustrating limb darkening phenomenon of the optical system. In FIG. 14, the bold circle outermost among a number of concentric circles denotes an image circle 15 of the optical system.

A landscape rectangle within the image circle 15 denotes an imaging area 16 of the two-dimensional image sensor such as CCD. An image 18 shown below the image circle 15 in FIG. 14 represents an image output from the two-dimensional image sensor, which includes an image of a person-like object in the vicinity of the center of the imaging area 16.

In general, an optical system of a camera, brightness at a point on an image is determined depending on characteristics of the optical lens and has "limb darkening characteristics". That is, the brightness at a point on an image is given by $\cos^4\theta$, where $\theta$ denotes an angle between a line connecting the point on the image with an optical lens and an optical axis of the optical lens. In short, a point on an image produced through the optical lens darkens gradually as the point moves from the center of the image to the edge.

In FIG. 14, a number of concentric circles arranged within the image circle 15 schematically indicate the limb-darkening characteristics. A closer space between the circles expresses that darkening rate is larger.

In most today's cameras, various devices such as special combination of optical lenses are made to solve or remove problems caused by the limb-darkening characteristics of the optical lens.

In actual situation, the above devices need substantial production costs, and therefore it is common that these devices are employed only in some single-lens reflex cameras.

In widely used cameras, the limb darkening is accepted to some extent, but most cameras employ a sort of image processing for compensating for the limb darkening.

Japanese Patent Application 2002-296685 A describes a technique (hereinafter, a "third conventional technique") that increases brightness at a point on the image 18 shown in FIG. 14 as the point moves to edge of the image, thereby solving the problem of limb darkening without increasing costs.

The limb darkening effect appears in the original image 18 as illustrated by spaces between concentric circles shown within the image 18. The third conventional technique uses such proper compensation data as cancels the limb darkening effect in the image 18 to make brightness distribution even and/or flat over the image 18.

However, when the third conventional technique (a method of processing an image to compensate for limb darkening in the image) is applied to the second conventional technique without any modification made to said third conventional technique, it is hard to make brightness distribution flat or even over the finally obtained image 10 which is subjected to limb darkening effect.

FIG. 15 is a view illustrating disadvantages caused by the conventional techniques.

In FIG. 15, a process is shown, for simplicity, in which two images (first image 19 and second image 20) which have been photographed continuously are combined together to generate one combined image 21.

A person 22 appears approximately at the center of the first image 19, and in the second image 20 the same person 23 appears at a position shifted slightly in a lower rightward direction from the position of the person 22 in the first image 19. That is, camera shake makes the position of the person 23 in the second image 20 shift from the position of the person 22 in the first image 19.

As a result of alignment of the person 22 in the first image 19 and the person 23 in the second image 20 in the second conventional technique, the combined image 21 is obtained with a person 24 appearing approximately at the center thereof.

Blacked out portions of the first image 19 and the second image 20 in FIG. 15 schematically represent a portion 25 of low brightness in the first image 19 and a portion 26 of low brightness in the second image 20, respectively. These portions of low brightness are yielded due to limb-darkening characteristics of the optical system of the camera.

In reality, brightness varies linearly in the portion of low brightness yielded due to the limb-darkening characteristics, and therefore the portion of low brightness is by no means simply blacked out.

But for simplicity in explanation, it is assumed that brightness varies in two steps as illustrated by white portions (portions of high brightness) in the vicinity of the persons 22, 23 and blacked out portions (portions of low brightness) 25, 26.

In the case where the first image 19 including the low-brightness portion 25 and the second image 20 including the low-brightness portion 26 are aligned to produce the combined image 21, low-brightness portions due to the limb-darkening characteristics are made complex in shape in the combined image 21 as shown in FIG. 15.

That is, since the second image 20 is shifted by a predetermined distance in an upper leftward direction to be aligned with the first image 19 whereby the combined image 21 is produced, portions of low brightness included in the combined image, due to the limb-darkening characteristics consist of the low-brightness portion 25 of the first image 19, low-brightness portion 26 of the second image 20, and a superimposed portion (medium-brightness portion) 27 of the two low-brightness portions 25 and 26.

As described above, the combined image 21 includes not only low-brightness portions 25, 26 but also the medium-brightness portion 27, which is brighter than the low-brightness portions 25, 26. Therefore, when simple compensation is made to the combined image based on the limb-darkening characteristics of the optical system to as to compensate for low brightness in the combined image, the medium-brightness portion 27 would have been compensated for excessively.

The compensation process described above is not practicable to make brightness distribution (low-brightness portions 25, 26 and medium-brightness portion 27) due to the limb darkening even or flat in the finally obtained image.

Therefore, when the second conventional technique is used to compensate for limb darkening in the image, limb darkening in the first and second images 19, 20 shown in FIG. 15 must be compensated for separately, before these images 19 and 20 are combined together.

As a result, a problem is yielded that the more images have to be compensated, the longer time is required to compensate for limb darkening in the images.

SUMMARY OF THE INVENTION

According to one aspect of the invention, there is provided an imaging apparatus which comprises a photographing unit having an optical system for photographing an object through the optical system to generate an image of the object, a combining unit for correcting displacement of plural images of the same object generated by the photographing unit and for combining the plural images whose displacement has been corrected, thereby generating a combined image, and a limb-darkening compensating unit for compensating for limb darkening in the combined image generated by the combining unit based on limb-darkening characteristics of the optical system.

According to another aspect of the invention, there is provided a method of photographing an object, which comprises photographing an object through an optical system to generate plural images of the object, correcting displacement of the plural images to combine said plural images, thereby generating a combined image, and compensating for limb darkening in the combined image based on limb-darkening characteristics of the optical system.

According to other aspect of the invention, there is provided a computer program product stored on a computer readable medium for controlling operation of a computer, the computer program product making the computer operate as means including means for photographing an object through an optical system to generate plural images of the object, means for correcting displacement of the plural images to combine said plural images, thereby generating a combined image, and means for compensating for limb darkening in the combined image based on limb-darkening characteristics of the optical system.

BRIEF DESCRIPTION OF THE DRAWINGS

FIG. 3 is a view schematically illustrating an idea of a limb-darkening compensation process to be executed on a combined image.

FIG. 9 is a flow chart of a process for making limb-darkening compensation on the basis of considerations of displacement between the optical lens and the light receiving unit.

DETAILED DESCRIPTION OF THE PREFERRED EMBODIMENTS

Now, embodiments of the present invention which are applied to a digital camera will be described in detail with reference to the accompanying drawings.

Note that various detailed definitions, samples, numerals, character strings, and other symbols referred in the description of the embodiments of the present invention are used to make the idea of the present invention more clear, but are not to restrict the scope of the present invention.

Well known methods, processes, architecture, and well known circuit configurations (hereinafter, "well known matters") will not be described in detail.

In short, these well known matters are for simplicity in description, and these well known matters or a part thereof are not intentionally removed.

These well known matters are known to a person skilled in the art and therefore are included in the description hereinafter.

First Embodiment of the Invention

Figure 1:
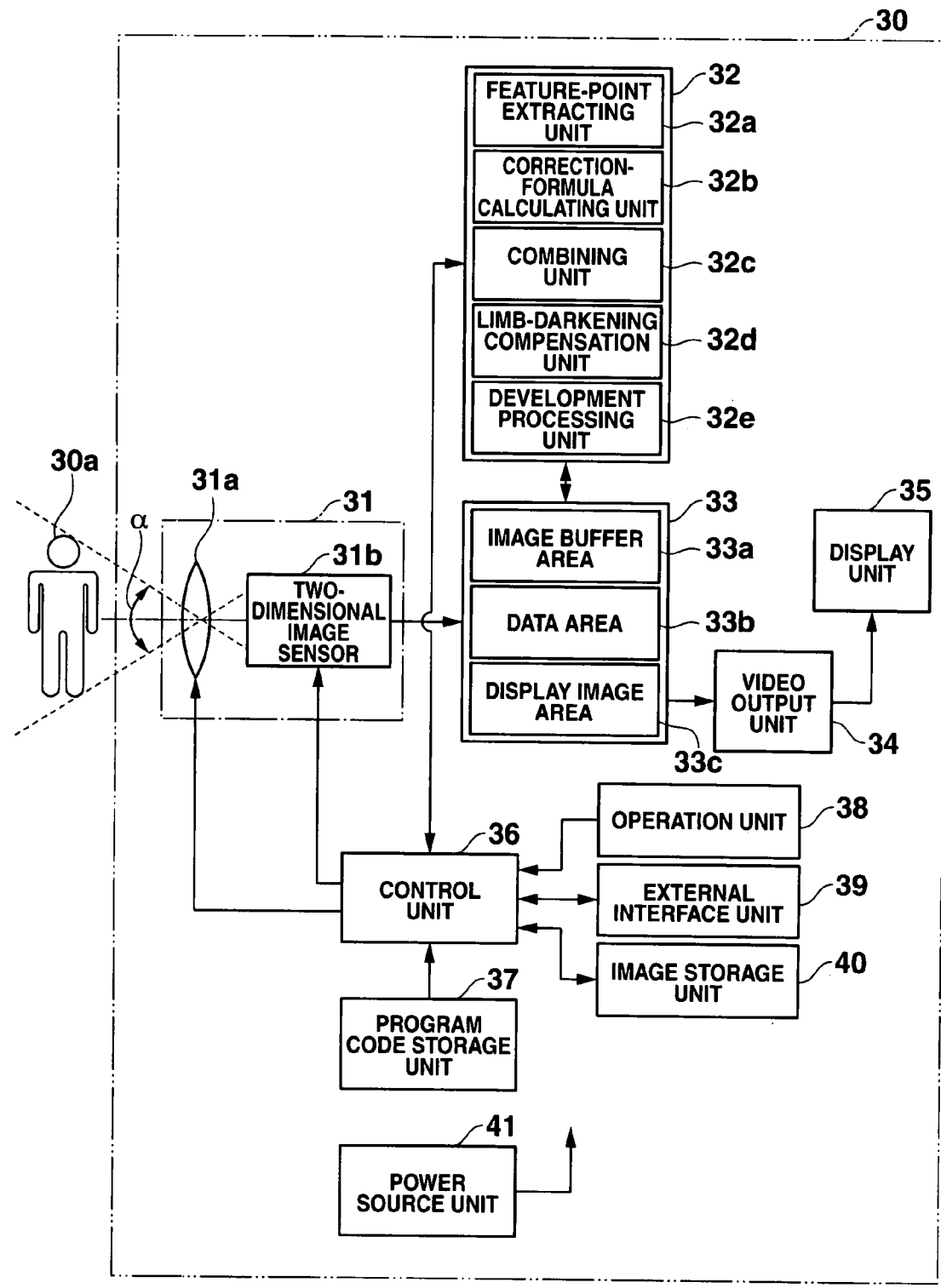
FIG. 1 is a block diagram showing a configuration of a digital camera.

FIG. 1 is a block diagram showing a configuration of a digital camera.

The digital camera 30 comprises an image pick-up unit 31, image processing unit 32, memory unit 33, video output unit 34, display unit 35, control unit 36, program code storage unit 37, operation unit 38, external interface unit 39, image storage unit 40 and power source unit 41.

The image pick-up unit 31 has an optical system 31a and a two-dimensional image sensor 31b. The optical system 31a includes a photographic lens which comprises a single lens or an assembly of plural lenses, aperture adjustment mechanism, focus adjustment mechanism, and a zoom mechanism for adjusting an angle "α" of view (or focal length). The two-dimensional image sensor 31b consists of a semi-conductor device such as CCD sensor and CMOS sensor.

Operation of the image pick-up unit 21 is controlled in accordance with instructions of photographing operation sent from the control unit 36. The operation of the image pick-up unit 21 includes adjustment of aperture and zoom ratio, that is, adjustment of view angle "α", focus adjustment, and adjustment of exposure or amount of light allowed to fall on the two-dimensional image sensor 31b, and operation of reading an image.

The instructions of photographing operation sent from the control unit 36 include an instruction of reading an image of an object 30a of a low resolution (for example, XGA image of 1024×768 dots) at a high frame rate (for example, 30 fps), an instruction of reading an image of the object 30a of a high resolution (for example, image of 400 mega dots) at a low frame rate (for example, a frame rate a little lower than the above high frame rate of 30 fps), and an instruction of previously setting aperture, focusing operation and a zoom ratio which are required for reading the image. The image of a low resolution is prepared for a user to determine or confirm a composition of a photograph, and the image of a high resolution is prepared for taking a still photograph.

In response to the instruction sent from the control unit 36, the object image (hereinafter, a "through image") of the object 30a of a low resolution is periodically read from the image pick-up unit 31 at the high frame rate for confirming the composition of a photograph.

The through image is transferred from an image buffer area 33a of the memory unit 33 to a display image area 33c, and further to the video output unit 34, where the trough image is transformed to an image of a predetermined display format. The through image of a predetermined display format is sent to the display unit 35 consisting of a flat display device such as a liquid crystal display device to be displayed thereon.

Looking at the through image displayed on the display unit 35, the user or photographer (not shown) determines his or her desired composition of a photograph of the object 30a, for example, he or she determines the composition of a photograph so as to locate the object 30a approximately at the center of the photograph, and then the user presses a shutter button halfway to focus on the objects and to automatically determine the exposure time, and presses the shutter button completely to take a picture.

In response to the pressing operation of the shutter button by the user, an object image (hereinafter, a "normal still image") of the object 30a of a high resolution with the user's desired composition is read from the image pick-up unit 31.

The normal still image is taken in the control unit 36 from the image buffer area 33a of the memory unit 33, and converted, for example, to a compressed image file of JPEG format, and then stored in the image storage unit 40.

Meanwhile, the normal still image taken in the image buffer area 33a of the memory unit 33 is transferred to the display image area 33c, and is converted to a predetermined display format in the video output unit 34. The normal still image of the predetermined display format is displayed on the display unit 35 having a flat display device such as a liquid crystal display device for previously confirming an image.

Figure 12:
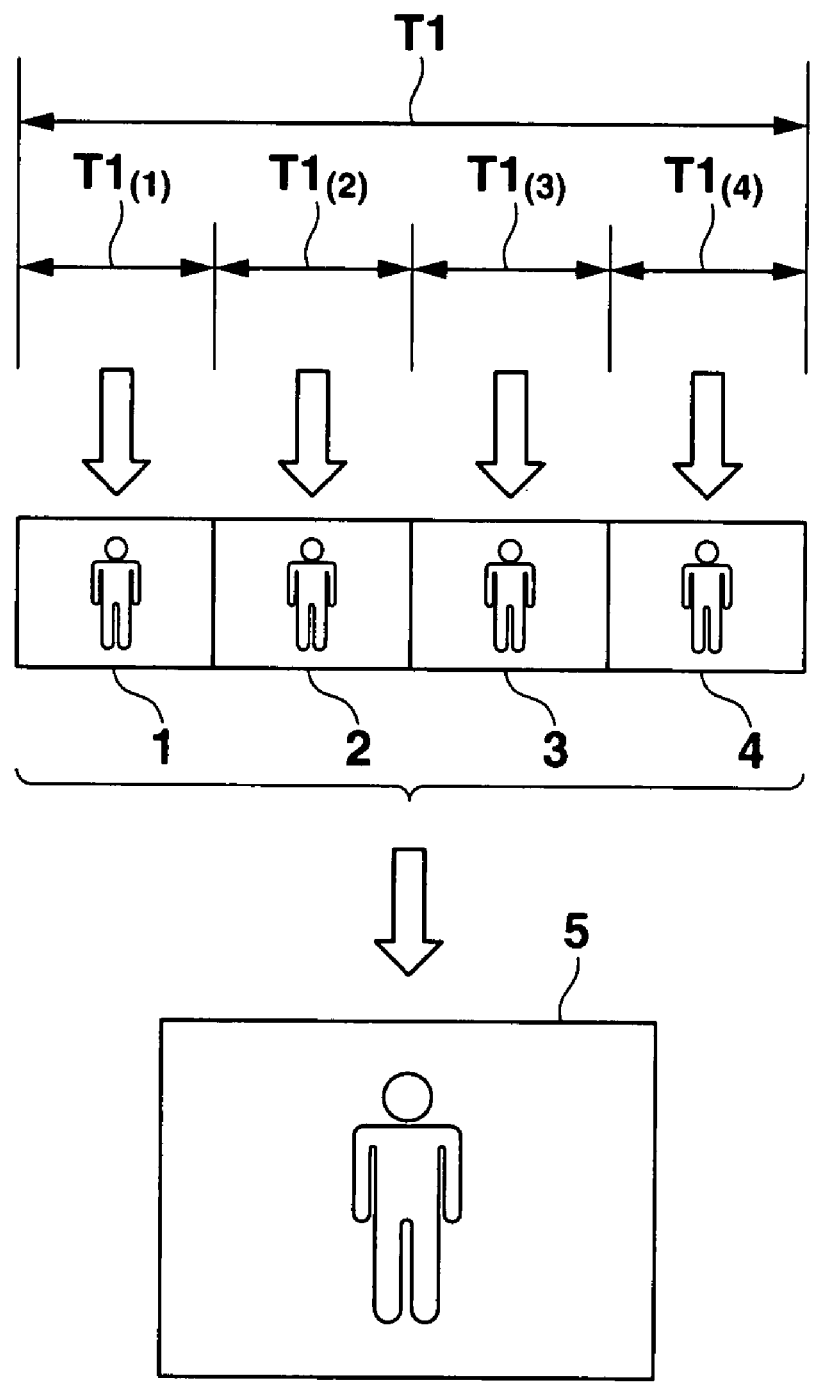
FIG. 12 is a view showing a general idea of a first conventional technique.
Figure 13A:
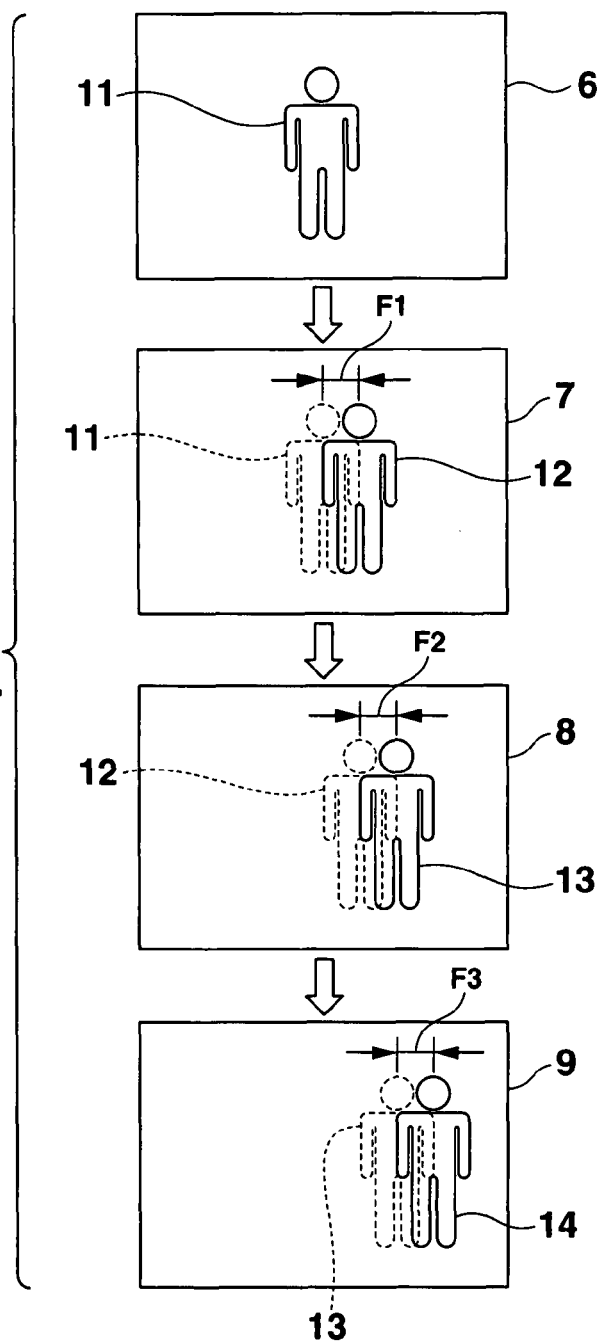
FIG. 13A is a view showing a general idea of a second conventional technique.
Figure 13B:
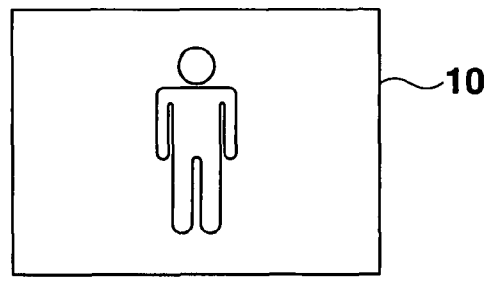
FIG. 13B is a view showing the general idea of the second conventional technique.
Figure 14:
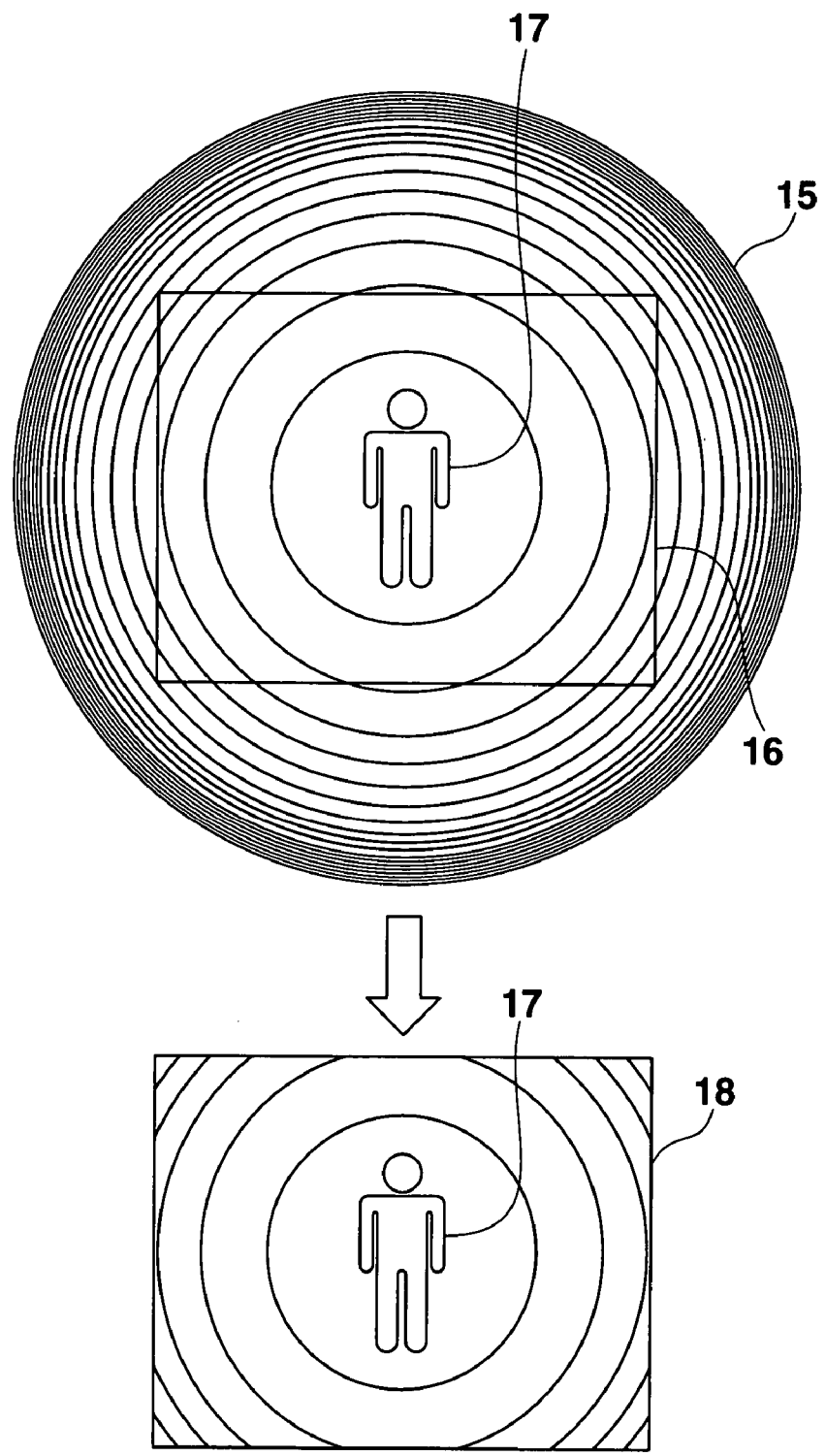
FIG. 14 is a view illustrating limb darkening of an optical system.

The functions of displaying a through image, storing an image (normal photographed image) of a high resolution, and displaying an image for previous viewing are provided not only on the digital camera 30 according to the embodiment of the present invention but also on other well known digital cameras. In addition to these functions, the digital camera 30 according to the embodiment of the present invention has a function that divides an exposure time (corresponding to the exposure time T1 in FIG. 12) equally into "n" pieces of exposure times, $T1_{(1)}$ to $T1_{(n)}$, and continuously reads "n" sheets of images (corresponding to the normal photographed image) of a high resolution from the two-dimensional image sensor 31b, where the exposure time is an appropriate exposure time for taking a picture under low light conditions where it is prohibited to use fill light such as a strobe light.

Hereinafter, the "n" sheets of high-resolution images are referred to as "continuous shots".

The continuous shots are used to be combined into one image, which will be described in detail hereinafter.

In addition to the buffer area 33a and display image area 33c, the memory unit 33 has data area 33b for storing image data required for the image processing unit 32 to process an image, values of various flags, and threshold values.

The operation unit 38 has various manual operation buttons or switches required for input interface to be operated by the user of the digital camera 30, including, for instance, a power switch, mode selecting switch for switching photographing mode to reproducing mode and vice versa, shutter button for taking a picture, menu button for displaying various setting menus, and selection button for selecting a menu item and/or selecting an image to be reproduced in the reproducing mode.

The video output unit 34 converts various sorts of display data written onto display image area 33c of the memory unit 34 into data of a predetermined display format, and outputs the data of the predetermined display format to display unit 35. The display data described above includes still image data for previous view and image data to be reproduced.

The external interface 39 is a data input/output unit corresponding to a general-purpose protocol such as USB and IEEE1394.

The external interface 39 is provided for transferring photographed images stored in the image storage unit 40 to a personal computer (not shown) and/or receiving photographed images from the personal computer to store the same data in the image storage unit 40.

The image storage unit 40 comprises a nonvolatile storage of a large capacity, such as a flash memory, hard disk, and optical disk, (data stored on which is not eliminated even when the power source is turned off), and is used to store and hold thereon images photographed with the digital camera 30. The images to be stored may be compressed data files of JPEG format or non-compressed data files (RAW files).

The image storage unit 40 may be fixedly mounted on the digital camera 30.

Further, the image storage unit 40 may be a general-purpose memory device which is detachably mounted on the personal computer (not shown).

The program code storage unit 37 is a nonvolatile memory for storing various kinds of software resources. The software resource includes a control program for making the digital camera 30 perform various operations (photographing operation, image reproducing operation, and other controlling operation).

According to need, these software resources are read from the program code storage unit 37 and written into the control unit 36 to be run by the control unit 36.

The power source 41 comprises a rechargeable battery or a primary battery, and applies a required power voltage to the image pick-up unit 31, image processing unit 32, memory unit 33, video output unit 34, display unit 35, control unit 36, program code storage unit 37, operation unit 38, external interface unit 39, and the image storage unit 40.

The image processing unit 32 comprises a feature-point extracting unit 32a, correction-formula calculating unit 32b, combining unit 32c, limb-darkening compensation unit 32d, and development processing unit 32e. The image processing unit 32 executes a process unique to the present invention (an image combining process of combining plural images which have been photographed continuously under poor light conditions where fill light such as strobe light is not allowed to use).

The feature-point extracting unit 32a uses the well known technique (disclosed, for example, in Japanese Patent Application No. 2005-182098 A) to extract feature points of plural images ("n" sheets of high-resolution images) which are read continuously from the two-dimensional image sensor 31b to correct: displacement or movement between the images.

The above feature points are portions in one image, which have striking pixel levels, and indicate pixels, or blocks or areas consisting of plural pixels. The above feature points mean edge portions in the image or portions striking in color.

In general, plural feature points are extracted from one image.

Plural images are continuously photographed respectively with exposure times $T1_{(1)}$ to $T1_{(n)}$, which exposure times are obtained by dividing an exposure time (corresponding to the exposure time T1 in FIG. 12) adjusted for taking a picture in absence of light.

These plural high-resolution images are adjacent to each other on a time axis like the "n" sheets of high-resolution images described above.

In other words, these images are plural pictures of the same object 30a photographed with the same composition.

The feature points are extracted from these plural images, and corresponding feature points in the images adjacent on the time axis are checked, whereby difference of the feature points of images in position and in direction are detected, and then images are aligned so as to minimize these differences (movement is corrected).

Based on positional relationship between the feature points of the continuously photographed images, the correction-formula calculating unit 32b calculates information (movement information) about displacements, rotation angles and declination of the continuously photographed images.

Figure 15:
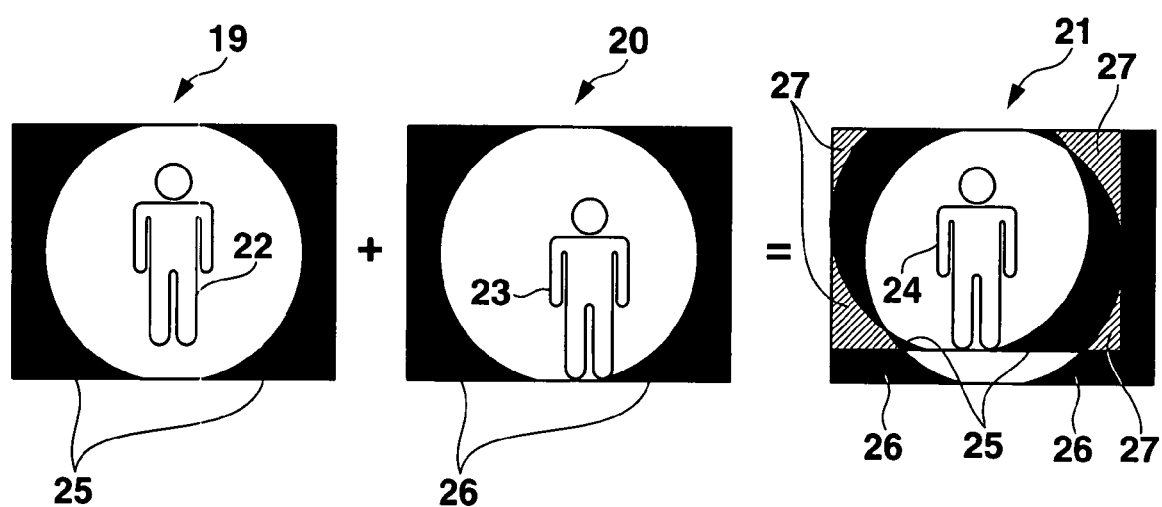
FIG. 15 is a view illustrating disadvantages of the conventional technique.

For instance, taking the first and second images in FIG. 15 as an example, a displacement, rotational angle and declination of the person 23 appearing in the second image are calculated based on the position of the person 22 appearing in the first image 19.

Based on the calculated information, the formula (1) is subjected to matrix calculation such as affine transformation, thereby correcting coordinates of the second image 20 to correct displacement between the images (first and second images) adjacent on the time axis so as to make the objects (persons 22 and 23) overlap with each other.

[Formula 1]

$$(x', y', z') = (u, v, l) \begin{pmatrix} a_{11} & a_{12} & a_{13} \\ a_{21} & a_{22} & a_{23} \\ a_{31} & a_{32} & a_{33} \end{pmatrix} \quad (1)$$

Using the information (correction formula) obtained by the compensation-formula calculating unit 32b, the combining unit 32c calculates the coordinates of the second image 20 which have not yet been corrected with reference to the coordinates of the second image 20 which have been corrected.

In this way, corrected-pixel information is obtained, and the images can be combined.

When the camera has been shaken during photographing operation, compositions of pictures can change slightly, and as a result, some areas of the pictures cannot be combined.

Concerning the disadvantage, a brightness curve (limb-darkening characteristic component for compensation) is generated focused on limb darkening in the continuously photographed images, as shown by the formula (2), and coordinate correction is effected without adding brightness of the images, wherein pixel levels equivalent to the original image can be generated.

[Formula 2]

$$X_n = [X_{n-1} \times (n+1)]/n \quad (2)$$

where $X_n$ denotes a pixel level after addition, $X_{n-1}$ denotes a pixel level before addition, and "n" denotes the number of combined images.

The limb-darkening compensation unit 32d compensates for skewed distribution of image brightness of the photographed image due to the limb darkening of the optical system 31a. In general, brightness compensation is made in two cases, that is, in the first case, the brightness compensation is made on a photographed image (one high-resolution image photographed under proper light conditions), and the technique for making this brightness compensation in the first case corresponds to the third conventional technique described above, and hereinafter, referred to as a "limb-darkening compensation" for a normally photographed image. In the second case, brightness compensation is made on the image combined by the combining unit 32c, and the technique for making the brightness compensation on the combined image is unique to the present invention and hereinafter referred to as a "limb-darkening-compensation" for the combined image.

The "limb-darkening compensation" for a normally photographed image is made on one sheet of photographed image, and skewed distribution of image brightness on the photographed image is compensated for based on the limb-darkening characteristics unique to the optical system 31a.

In the second case ("limb-darkening compensation" for a combined image), and especially when the camera is shaken, the combined image generated by the combining unit 32c includes not only low brightness portions (low brightness portions 25, 26 in FIG. 15) due to the limb-darkening characteristics of the optical system 31a but also medium brightness portions (medium brightness portion 27 in FIG. 15) which are brighter than the low brightness portion.

Therefore, when compensation is made based only on the limb-darkening characteristics of the optical system 31a, the medium brightness portions would have been compensated excessively, and the brightness distribution (low brightness portions 25, 26 and medium brightness portion 27 due to the limb darkening) could not be made flat or even on the finally obtained image (combined image). To make the brightness distribution flat or even on the combined image, some device will be necessary.

In the embodiment of the present invention, a brightness curve (limb-darkening characteristic compensation component) is prepared, in which effect of camera shake is taken into consideration, and compensation is made using the brightness curve for limb-darkening in the combined image. The compensation is made only on the combined image, thereby decreasing a time required to execute a limb-darkening process.

The processes executed in the embodiment will be described in detail.

The limb-darkening phenomenon is caused due to an optical lens. Characteristics of the optical lens will be described.

In the case of a simple spherical lens, the limb-darkening characteristics are expressed by the formula (3) of the cosine fourth law (theoretical formula expressing limb darkening in shingle sheet of image).

[Formula (3)]

$$E = E\omega \times \cos^4\theta \qquad (3)$$

where E denotes illuminance depending on an angle $\theta$ in curvature field, $E\omega$ denotes illuminance at the center ($\theta=0$) of the optical axis, and $\theta$ denotes an angle between the optical axis of lens and a position in curvature field.

In the image photographed by the image pick-up unit 31, brightness decreases towards the image periphery in accordance with the limb darkening characteristics of the formula (3).

Meanwhile, an image to be subjected to the limb-darkening compensation for a combined image is the combined image produced by the combining unit 32c, and when camera has been shaken to produce such combined image, the limb-darkening areas in the combined image are those areas generated by putting one on top of other limb-darkening areas in images each with the center of the optical axis displaced.

Figure 2A:
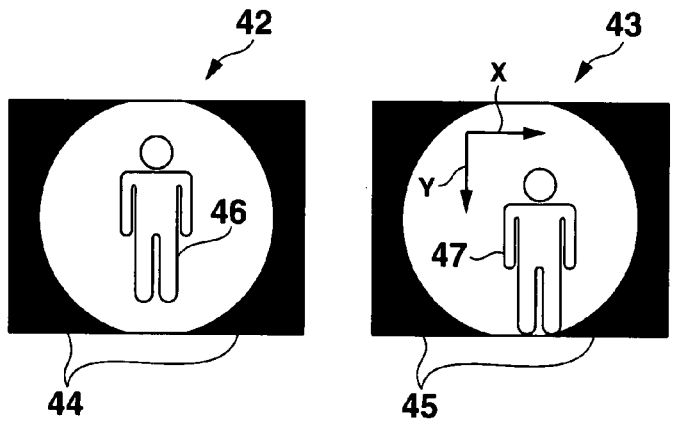
FIG. 2A is a view schematically illustrating an idea of generating a brightness curve on the basis of consideration of camera shake.

An idea of generating a brightness curve, in which camera shake is taken into consideration, will be described referring to FIGS. 2A and 2B. FIG. 2A is a view illustrating two sheets (n=2) of images (hereinafter, first image 42 and second image 43) which have been photographed continuously with the camera shaken.

In FIG. 2A, the first image 42 and second image 43 have blacked out portions respectively, which are low brightness portions 44 and 45 generated due to the limb darkening characteristics of the optical system 31a.

As described above, actually, brightness decreases towards the image periphery in the limb darkening area, but it is assumed that the limb darkening areas are indicated respectively by the low brightness portions 44 and 45, in which brightness are kept constant.

The low brightness portion 44 in the first image 42 and low brightness portion 54 in the second image 43 locate at the same position in the respective images and have the same size, and further have the darkening rate.

This is because a relative positional relationship between the optical system 31a and an image pick-up plane of the two-dimensional image sensor 31b is the same in the first image 42 and second image 43.

On the contrary, the object 47 appearing in the second image 43 does not meet completely with the object 46 appearing in the first image 42.

The misalignment of the objects 47 and 46 is caused by camera shake.

More specifically, this is because the camera has been shaken slightly in a lower rightward direction (in a synthetic direction between Y-direction and X-direction) in FIG. 2A.

Figure 2B:
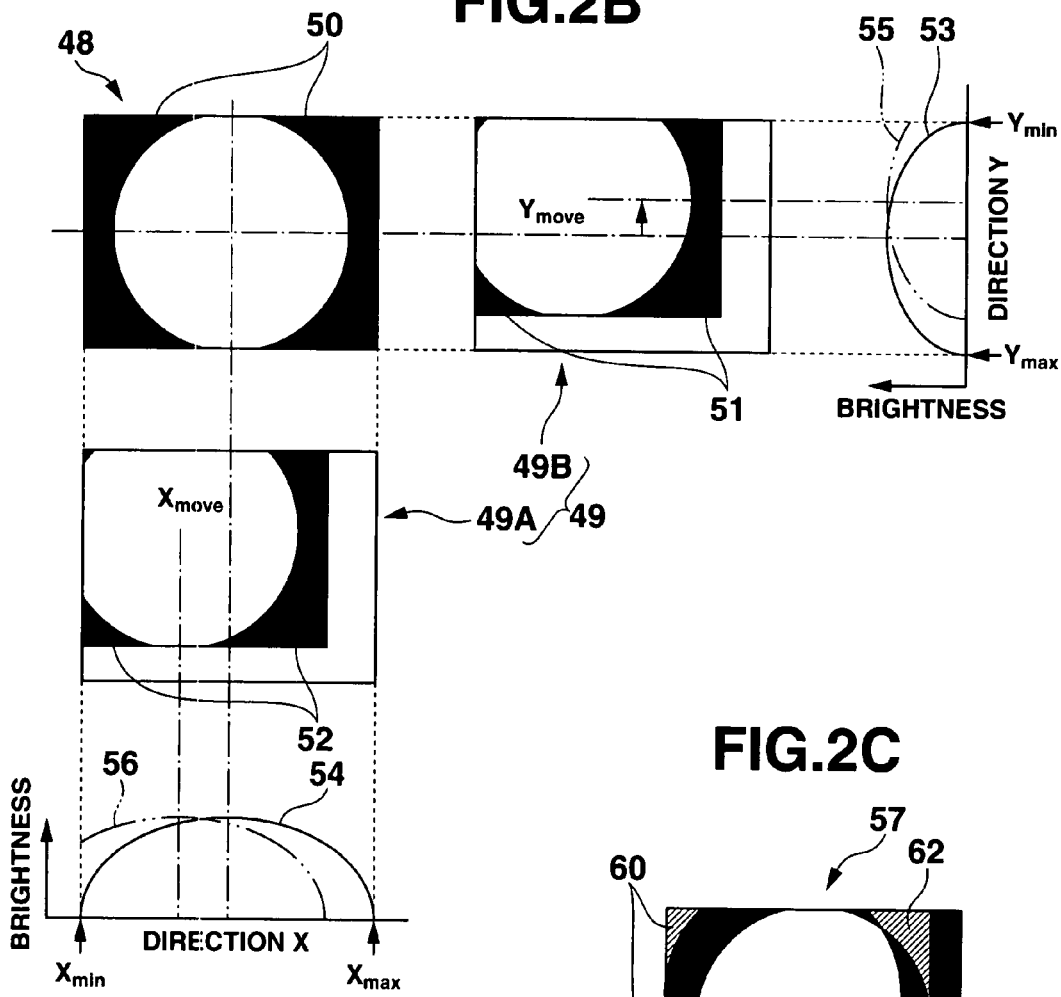
FIG. 2B is a view schematically illustrating an idea of generating a brightness curve on the basis of consideration of camera shake.

FIG. 2B is a view illustrating a reference limb-darkening image 48 and position-displaced limb-darkening images 49 to which the reference limb-darkening image 48 is displaced. For convenience of explanation of the position-displaced limb darkening image 49 which has been displaced by a predetermined amount (Y-move) in Y-direction and by a predetermined amount (X-move) in X-direction, there are shown in FIG. 2B two position-displaced limb darkening images, that is, one is the position-displaced limb darkening image 49A which is for explaining a displacement amount in X-direction and displaced in X-direction, and other is the position-displaced limb darkening image 49B which is displaced in Y-direction. These displacement amounts (X-move and Y-move) correspond to displacement amounts in X- and Y-directions between the object 46 in the first image 42 and the object 47 in the second image 43 shown in FIG. 2A.

In other words, when the object 47 in the second image 43 is moved by an amount of Y-move in Y-direction and further moved by an amount of X-move in X-direction, then the position of the object 47 in the second image 43 matches with the object 46 in the first image 42.

The blacked out portions in the two images (reference limb-darkening image 48 and position-displaced limb-darkening image 49) schematically shows low-brightness portions 50, 51 and 52. The low-brightness portion 50 in the reference limb-darkening image 48 corresponds to the low-brightness portion 45 in the second image 43 which has not yet been displaced in FIG. 2A. The low-brightness portions 51, 52 in the position-displaced limb-darkening image 49 correspond to the low-brightness portion 45 in the second image 43 which has been displaced.

More specifically, the low-brightness portion 50 in the reference limb-darkening image 48 corresponds to a limb-darkening area generated due to the limb-darkening characteristics of the optical system 31a. Meanwhile, the low-brightness portion 51 in the position-displaced limb-darkening image 49B corresponds to a limb-darkening area generated due to the limb-darkening characteristics of the optical system 31a, and displaced by an amount of Y-move in Y-direction. Similarly, the low-brightness portion 52 in the position-displaced limb-darkening image 49A corresponds to a limb-darkening area generated due to the limb-darkening characteristics of the optical system 31a, and displaced by an amount of X-move in X-direction. As described above, these displacements (X-move and Y-move) correspond to displacements in X- and Y-directions between the object 46 of the first image 42 and the object 47 of the second image 43 shown in FIG. 2A.

Brightness distribution in Y-direction in the low-brightness portion 50 of the reference limb-darkening image 48 is expressed by a brightness varying characteristic curve 53, which reaches the maximum in the vicinity of the center of the image and decreases towards the peripherals (Y-max, Y-min)

of the image in accordance with the limb-darkening characteristics unique to the optical system 31a, as shown at the right side in FIG. 2B.

Similarly, brightness distribution in X-direction in the low-brightness portion 50 of the reference limb-darkening image 48 is expressed by a brightness varying characteristic curve 54, which reaches the maximum in the vicinity of the center of the image and decreases towards the peripherals (X-max, X-min) of the image, in accordance with the limb-darkening characteristics unique to the optical system 31a, as shown at the lower side in FIG. 2B.

Meanwhile, brightness distribution in Y-direction in the low-brightness portion 51 of the position-displaced limb-darkening image 49B is expressed by a brightness varying characteristic curve 55, which reaches the maximum at a position displaced by an amount of Y-move in Y-direction from the center of the image towards Y-min and decreases towards the peripherals (Y-max, Y-min) of the image, as shown at the right side in FIG. 2B.

Similarly, brightness distribution in X-direction in the low-brightness portion 52 of the position-displaced limb-darkening image 49A is expressed by a brightness varying characteristic curve 56, which reaches the maximum at a position displaced by an amount of X-move in X-direction from the center of the image towards X-min and decreases towards the peripherals (X-max, X-min) of the image, as shown at the right side in FIG. 2B.

In the embodiment of the present invention, brightness compensation data (limb-darkening characteristic component for compensation) for compensating for limb darkening in the combined image is produced based on these limb-darkening images (the reference limb-darkening image 48 and position-displaced limb-darkening images 49A, 49B).

That is, the brightness compensation data is produced based on the reference limb-darkening image 48 corresponding to the first image 48 and the position-displaced limb-darkening images 49A, 49B corresponding to the displaced second image 43. The brightness compensation data for compensating for limb darkening in the combined image, produced as described above is shown in FIG. 2C.

Figure 2C:
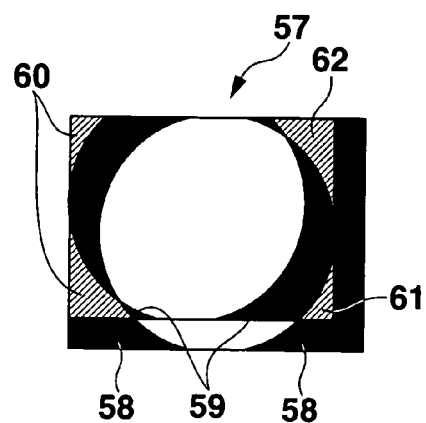
FIG. 2C is a view schematically illustrating an idea of generating a brightness curve on the basis of consideration of camera shake.

The brightness compensation data (limb-darkening characteristic component for compensation) 57 shown in FIG. 2C is generated by combining the low brightness portion 50 of the reference limb-darkening image 48 with the low brightness portions 51, 52 of the position-displaced limb-darkening images 49A, 49B.

Blacked out portions 58, 59 of the brightness compensation data 57 correspond to the low brightness portions 50, 51 and 52 of the reference limb-darkening image 48 and the position-displaced limb-darkening images 49A, 49B. Hatched portions 60, 61 and 62 correspond to portions (medium brightness portions) where the low brightness portions 50, 51 and 52 are put on top of other.

Comparing the brightness compensation data 57 with the combined image (for example, the combined image 21 shown in FIG. 15), it will be found that the low brightness portions and the medium brightness portions shown in FIGS. 2C and 15 are the same in position and size.

Therefore, using the low brightness portions and medium brightness portions of the brightness compensation data 57 so as to deny the low brightness portions and medium brightness portions of the combined image 21, limb darkening in one sheet of combined image can be compensated for in one process, whereby a time required in the limb-darkening compensation process may be decreased.

FIG. 3 is a view schematically illustrating an idea of a limb-darkening compensation process to be executed on the combined image.

In FIG. 3, an image 63 is the same as the combined image 21 shown in FIG. 15.

When the brightness compensation data 57 shown in FIG. 2C is applied to the combined image 63, the low brightness portions and the medium brightness portions in the combine image 63 are denied by the low brightness portions and medium brightness portions of the brightness compensation data 57.

In the manner mentioned above, an image 64 may be obtained, whose limb-darkening portions have been compensated, and in which brightness distribution has been made flat with the low brightness portions and medium brightness portions removed from the combined image 63.

In the above explanation, the case where two images are combined has been described for simplicity, but the technical idea described above may be applied to the case where more than two images are combined.

Now, the first embodiment of the invention will be described in further detail.

In FIG. 2A, a position of the second image 43 is corrected in relation to the first image to be combined with the second image. When attention is focused only on the limb darkening, one image which is displaced by an amount of X-move in the horizontal direction and the other which is displaced by an amount of Y-move in the vertical direction are combined together in FIG. 2B.

Figure 4:
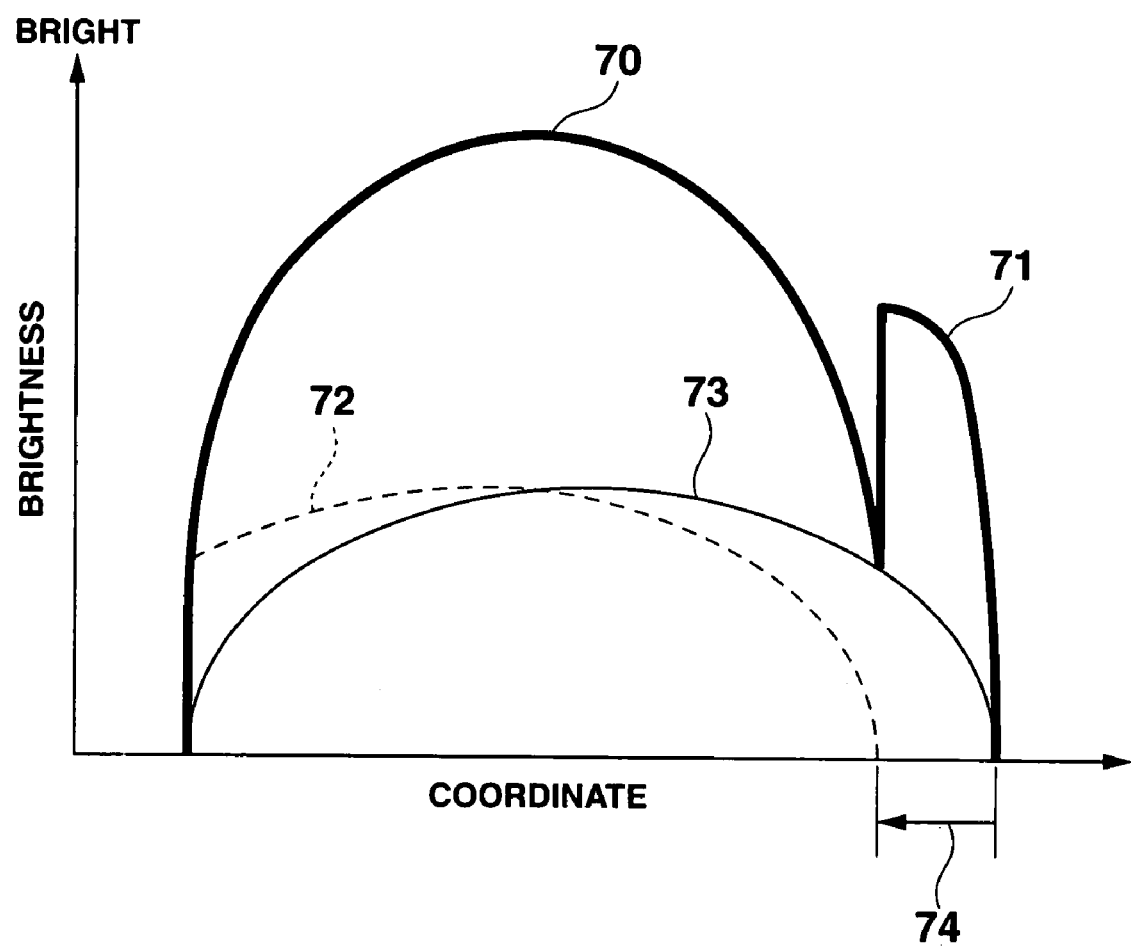
FIG. 4 is a view showing brightness curves which are generated based on limb darkening in images.

FIG. 4 is a view showing a brightness curve which is drawn while attention is focused on limb darkening.

In FIG. 4, a curve (dotted line) 72 corresponds to the brightness varying characteristic curve 56 in FIG. 2B.

A curve (solid line) 73 corresponds to the brightness varying characteristic curve 54 in FIG. 2B.

A curve (bold line) 70 corresponds to brightness varying characteristic curve obtained by combining the brightness varying characteristic curves 54 and 57 in FIG. 2B.

A portion corresponding to an arrow 74 indicates a dark image portion compared with other image portion, and brightness thereof is expressed only by the solid-line curve 73.

In other words, brightness of an area where a dark area is put on other dark area is compensated for inadequately, and brightness of an area where a light area is put on the dark area is compensated for excessively.

But as the number of images which are to be put on top of other increases, a light area is put on a dark area, whereby the brightness of the dark area is compensated for, but brightness of an excessively light area is by no means compensated for. Therefore, a combined brightness varying characteristic 71 is generated by applying the formula (2) to the solid-line curve 73, and the combined brightness varying characteristic 70 is combined with combined brightness varying characteristic 71, whereby more natural brightness of the image is realized.

Figure 5:
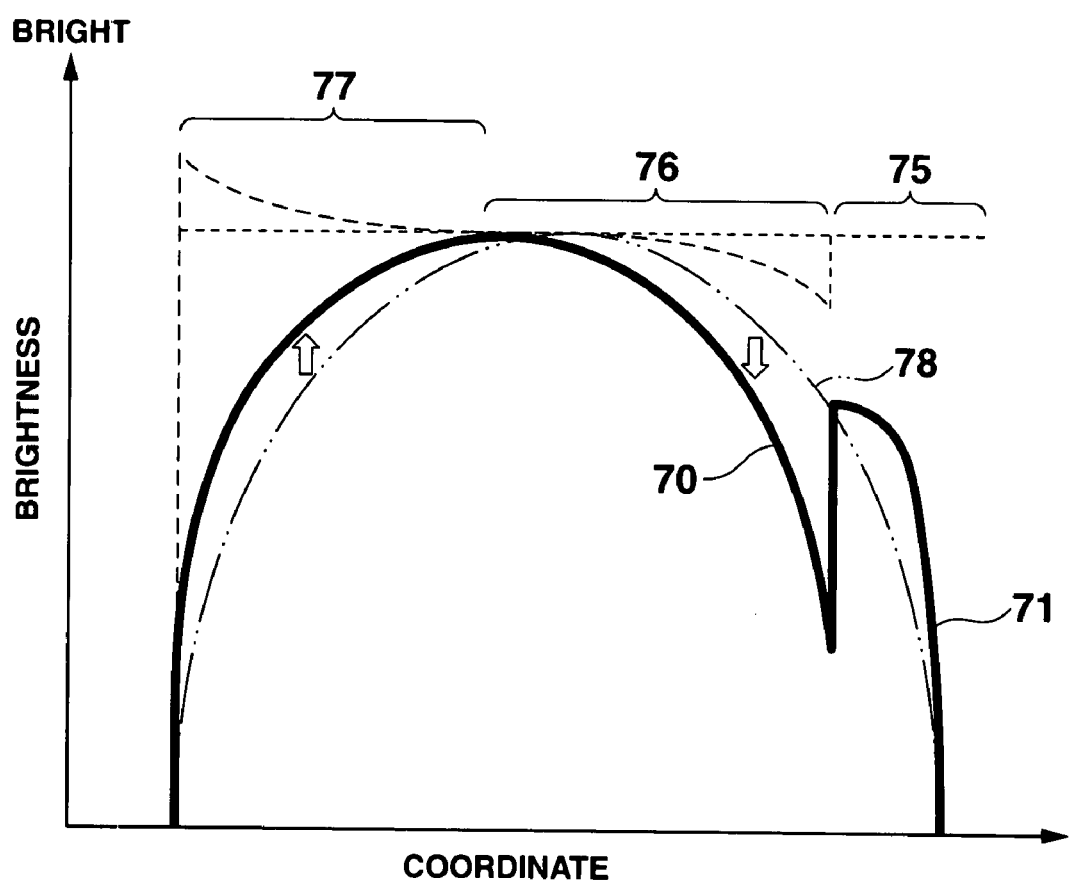
FIG. 5 is a view showing brightness curves which are generated based on limb darkening in images.

FIG. 5 is a view illustrating comparison of the combined brightness varying characteristic depending on the limb darkening in images with an ideal brightness varying characteristic.

In FIG. 5, a dashed-two dotted line 78 represents an ideal brightness varying characteristic of an image produced by combining two images which are not displaced from each other. Bold line portions 70, 71 in FIG. 5 are equivalent to the combined brightness varying characteristic portions 70, 71 in FIG. 4. Comparing the combined brightness varying characteristic portions 70, 71 with the ideal brightness varying characteristic 78, it will be found that the combined brightness varying characteristic portions 70, 71 in an area 77 are higher than the ideal brightness varying characteristic 78 and the combined brightness varying characteristic portions 70, 71 in an area 76 is lower than the ideal brightness varying characteristic 78.

In general, for limb-darkening compensation, brightness of an image is compensated for by multiplying coefficients shown by the formula (3) depending on a distance from the center of the image.

As illustrated by the combined brightness in FIG. 4 and the brightness 60 of the combined image which has been compensated for in FIG. 5, if a compensation coefficient depending on a distance equivalent to a distance in one sheet of image is multiplied to compensate for the brightness of the combine image, compensation in brightness would have been made excessively, since such distance is larger than a real distance.

This is because the peripherals of the image move towards the center due to the combined brightness which has been compensated for camera shake and the brightness of the combined image has risen.

Therefore, it will be necessary to calculate compensation coefficients which will not compensate for the risen brightness.

Therefore, it will be preferable to make the compensation coefficient maximum in a field angle boundary at the time when the image is displaced to the maximum due to camera shake.

In the above manner, most appropriate compensation will be made for the combined brightness.

Figure 6:
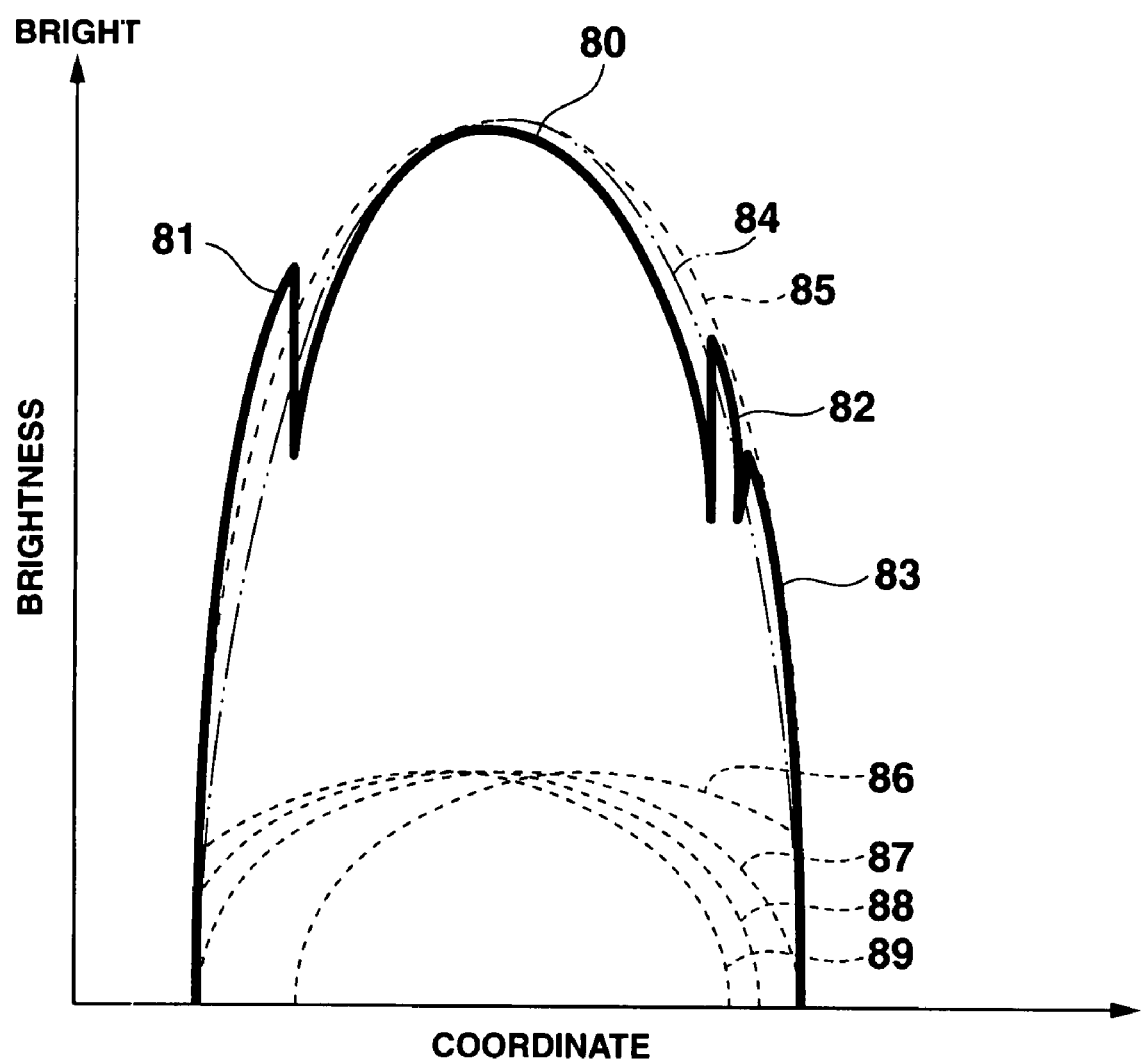
FIG. 6 is a view illustrating a brightness curve which indicates the maximum compensation coefficient at the field angle boundary at the time when the images are displaced to the maximum due to camera shake.

FIG. 6 is a view illustrating a brightness curve which represents brightness in an image (combined image) which has been produced by combining four images (brightness varying characteristics 86 to 89) and which indicates the maximum compensation coefficient at the field angle boundary when the images are displaced to the maximum due to camera shake.

Using the formula (4), a limb-darkening rate at the periphery of the image is calculated based on the maximum field angle displacement.

In FIG. 6, a bold-line portion 80 represents a combined brightness varying characteristic calculated by combing the brightness varying characteristics 86 to 89.

Bold-line portions 81, 82 and 83 represent brightness varying characteristics respectively, which are calculated by applying the formula (2) respectively to the brightness varying characteristics 86 to 89.

A dashed-two dotted line 84 represents a brightness varying characteristic indicating theoretical combined additional values in the case where no displacement has been caused in the optical axis.

A dotted line 85 represents a brightness varying characteristic indicating approximate values to actual combined additional values which are obtained by applying the formula (4) to the theoretical additional values shown by the dashed-two dotted line 84.

In other words, it will be found that the brightness varying characteristic 85 may be obtained, which indicates values that are closer to the theoretical values than compensation values which have been calculated using the formula (2) and indicated by the bold line portions 81, 82 and 83, as shown in FIG. 6.

[Formula 4]

$$f \sin \theta_x = x_{max} - x_{move}$$

$$f \sin \theta_y = y_{max} - y_{move}$$

$$\theta_x = \sin^{-1}(x_{max} - x_{move})$$

$$\theta_y = \sin^{-1}(y_{max} - y_{move})$$

$$R_x = 1/\cos^4\theta_x$$

$$R_y = 1/\cos^4\theta_y \qquad (4)$$

where "f" denotes a distance between the lens and the image pick-up plane, $\theta_x$ and $\theta_y$ denote angles of image boundaries within the field angles of a displaced image, $x_{max}$ and $y_{max}$ denote dimensions of the image in the horizontal and vertical directions, respectively, $x_{move}$ and $y_{move}$ denote displacements of the image in the horizontal and vertical directions, respectively, and $R_x$ and $R_y$ denote the maximum limb darkening compensation coefficients within the field angle of the displaced image, respectively.

The maximum limb darkening rate of the image which has not been displaced is calculated using a formula (5).

[Formula 5]

$$f \sin \theta_{xmax} = x_{max}$$

$$f \sin \theta_{ymax} = y_{max}$$

$$\theta_{xmax} = \sin^{-1}(x_{max})$$

$$\theta_{ymax} = \sin^{-1}(y_{max})$$

$$R_{xmax} = 1/\cos^4\theta_{xmax}$$

$$R_{ymax} = 1/\cos^4\theta_{ymax} \qquad (5)$$

where, $\theta_{xmax}$ and $\theta_{ymax}$ denote angles of image boundaries within the field angles of an image, and $R_{xmax}$ and $R_{ymax}$ denote the maximum limb darkening compensation coefficients within the field angle of the image, respectively.

Correction coefficients can be calculated using a formula (6). In other words, the formula (4) is derived using the formulas (5) and (6).

[Formula 6]

$$G = R_x/R_{xmax} \times (\text{if } R_x \leq R_y)$$

$$G = R_y/R_{ymax} \times (\text{if } R_x \leq R_y) \qquad (6)$$

where "G" denotes a displacement correction coefficient for the limb darkening compensation coefficient.

Multiplying the limb darkening compensation coefficient "R" by the displacement correction coefficient G of the formula (6) gives the limb darkening compensation corresponding to displacement for combining images.

The development processing unit 32e executes a predetermined post-processing on the combined image 64, limb darkening in which has been compensated.

That is, since the combining unit 32c combines images, positions of which have been compensated, the combined image can exceed an effective data range for one sheet of image.

To solve disadvantage described above, the development processing unit 32e employs either one of the following three measures.

[First Measure: Dividing by the Number of Images to be Combined]

In the case where each of plural images has been photographed in appropriate AE mode, image data (combined image data) of combined images exceeds the effective data range for one sheet of image, and therefore the combined image data is divided by the number of combined images in accordance with a formula (7).

[Formula 7]

$$X = X_n/n \quad (7)$$

where "$X_n$" denotes a pixel value after the images have been subjected to addition, "X" denotes a pixel value after the images have been developed, and "n" denotes the number of the images which have been combined.

[Second Measure: Adjusting Brightness at the Center of Image and Dividing by an Appropriate Number]

In the case where plural images have been photographed continuously in a short exposure-time mode, each image has been exposed imperfectly. But when these plural images have been combined, the combined image can be assumed to be exposed perfectly.

Therefore, if the combined image data is divided by the number of the combined images, in fact the image will be made dark. As in photometry, the combined image data may be divided in accordance with a formula (8) such that brightness of the combined image will be most appropriate.

[Formula 8]

$$Y = \frac{\sum_{x=left}^{right} \sum_{y=top}^{bottom} fY(x, y)}{n} \quad (8)$$

where "Y" denotes target-brightness, fY (x, y) denotes brightness of combined images at coordinates (x, y), (left top) denotes coordinates at a left top in an area where the amount of light is measured, (right bottom) denotes coordinates at a right bottom in the area where the amount of light is measured, and "n" denotes an appropriate divisor.

[Third Measure: Dividing by Histogram]

A range of histogram of the combined image data is searched, and the added image data is divided in accordance with a formula (9) such that the histogram falls within an appropriate range (effective range), whereby the added image data is included in the effective data range.

[Formula 9]

$$[HR_{max} - HR_{min}]/nr = \text{Range}$$

$$[HG_{max} - HG_{min}]/ng = \text{Range}$$

$$[HB_{max} - HB_{min}]/nb = \text{Range} \quad (9)$$

where $HR_{max}$ denotes the maximum value in histogram of a red element, $HR_{min}$ denotes the minimum value in histogram of the red element, "nr" denotes the most appropriate number for dividing the red element, $HG_{max}$ denotes the maximum value in histogram of a green element, $HG_{min}$ denotes the minimum value in histogram of the green element, "ng" denotes the most appropriate number for dividing the green element, $HB_{max}$ denotes the maximum value in histogram of a blue element, $HB_{min}$ denotes the minimum value in histogram of the blue element, "nb" denotes the most appropriate number for dividing the blue element, and "Range" denotes the maximum value available for each element in a generated image.

The post-processing to be executed on the combined image 64 has been described. Practically, it is necessary to discriminate a photographed image from a reference image (basically, first image).

Figure 7:
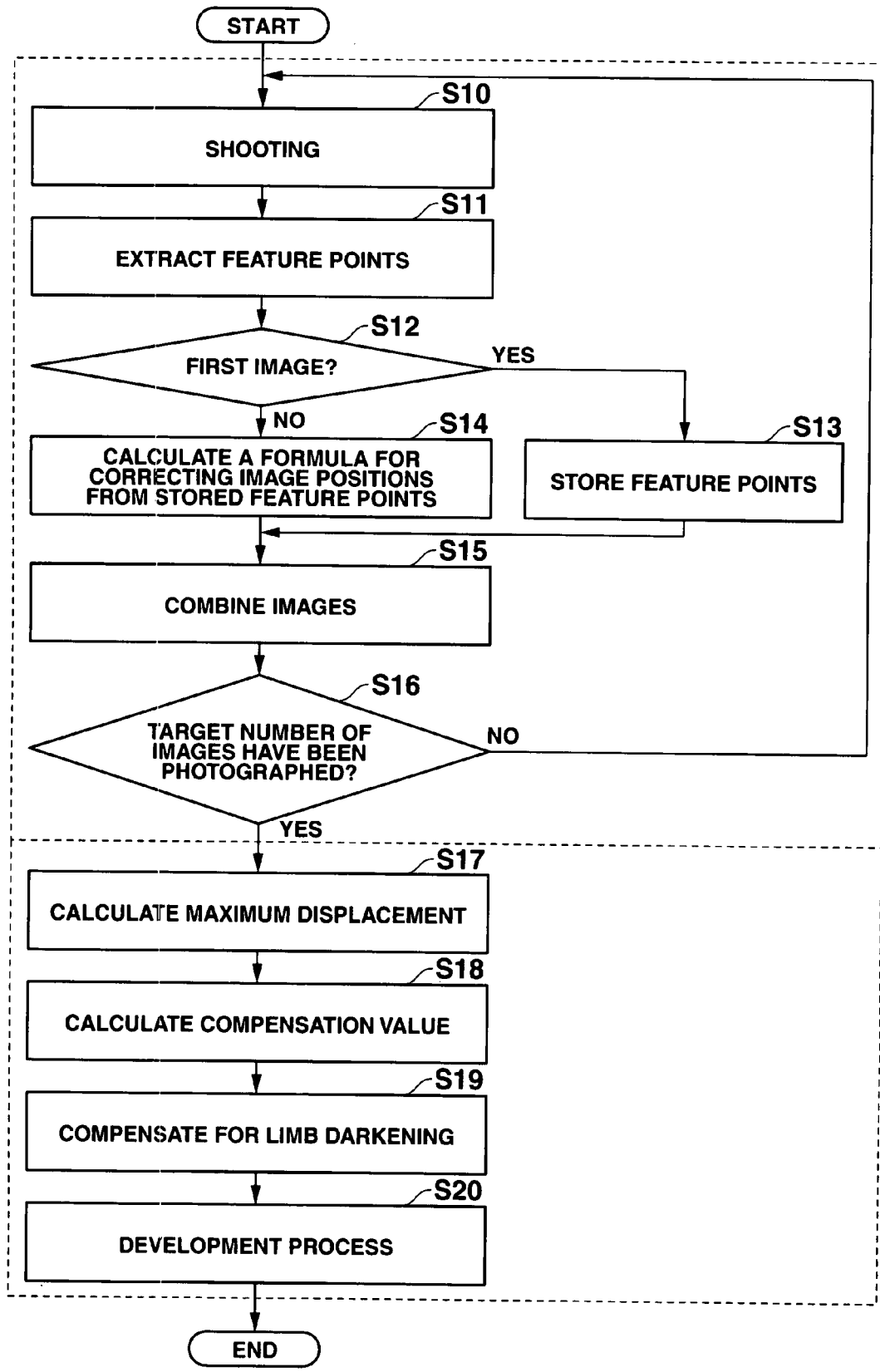
FIG. 7 is a flow chart of operation performed in the first embodiment of the imaging apparatus of the invention.

FIG. 7 is a flow chart of operation performed in the first embodiment of the imaging apparatus of the invention. A shooting is executed to generate an image at step S10. Feature points are extracted from the generated image at step S11. It is judged at step S12 whether the image, from which the feature points have been extracted is the first image or not. When it is determined at step S12 that the image is the first image (YES at step S12), the feature points are stored at step S13 to be used as reference coordinates for compensating an image (later image) to be photographed or generated later.

Meanwhile, when it is determined at step S12 that the image is not the first image (NO at step S12), the feature points stored at step S13 are compared with those extracted from such later image to calculate a formula for correcting or aligning a position of the later image on the basis of the reference image (first image) at step S14. Then, the later image is combined with the reference image in accordance with the calculated formula at step S15.

Since there is no need to align or correct a position of the first image, the first image is stored without any correction or alignment made thereto.

At the following step S16, it is judged whether or not the target number of images have been photographed. When it is determined at step S16 that the target number of images have not yet been photographed (NO at step S16), the processes at steps S10 to S16 are repeatedly executed until it is determined at step S16 that the target number of images have been photographed (YES at step S16).

When it is determined at step S16 that the target number of images have been photographed (YES at step S16), the maximum displacement of the images is calculated at step S17. A compensation value of the limb-darkening coefficient is calculated from the maximum displacement of the image at step S18.

Then, a compensation coefficient is calculated using the compensation value and limb-darkening compensation is executed on the combined image at step S19.

Finally, a development process is executed to make image data fall within the image data range at step S20. Then, the operation is completed for compensating the limb darkening in the combined image.

As described above, in the first embodiment of the invention, the limb-darkening in the combined image is compensated for based on the displacement of the images to be combined. In the conventional technique, limb darkening in each image is compensated for. But in the first embodiment of the invention, there is no need to compensate for limb darkening in each of images which have been photographed continuously and the limb darkening compensation process is executed once on the combined image Meanwhile. As a result, a time required to make the limb-darkening compensation can be decreased.

The limb darkening is caused on a photographed image concentrically with the center of the photographed image as the central axis, and therefore there is no need to pay attention to rotation of the image with the center of the photographed image as the rotation axis.

In short, with respect to the displacement or alignment of the images, there is no need to consider rotation thereof, but only displacements along X-axis and Y-axis should be considered. Note that X-move and Y-move are represented in the number of pixels.

In the first embodiment of the invention, the limb darkening in the image is compensated for based on the maximum displacement of the images to be combined, but such compensation may be made in the manner as described below.

FIGS. 16A to 16D are views illustrating concept of compensation for the limb darkening in the image based on an average of displacement amounts of the images. The formula (10) represents the concept.

[Formula 10]

$$\overline{M} = \left( \frac{\sum_{n=0}^{m} x_n}{m+1}, \frac{\sum_{n=0}^{m} y_n}{m+1} \right) \quad (10)$$

Figure 16A:
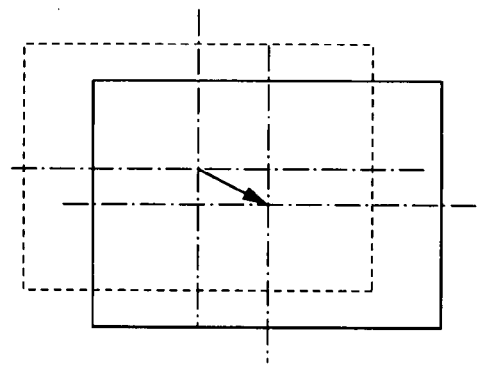
FIG. 16A is a view illustrating displacement of a second image to explain an average displacement.

FIG. 16A is a view illustrating displacement of the second image.

As shown in FIG. 16A, second image is displaced by the amount of 4 in X-axis direction and by the amount of −2 in Y-axis direction, as expressed by the formula (11). The first image (dotted line) is not displaced.

[Formula 11]

$$M_0 = (X_0, Y_0) = (4, -2) \quad (11)$$

Figure 16B:
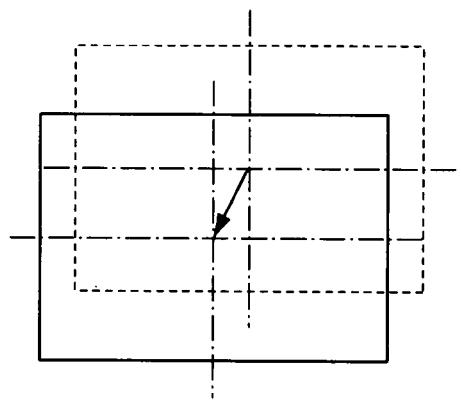
FIG. 16B is a view illustrating displacement of a third image to explain an average displacement.

FIG. 16B is a view illustrating displacement of the third image.

As shown in FIG. 16B, the third image is displaced by the amount of −2 in X-axis direction and by the amount of −4 in Y-axis direction, as expressed by the formula (12).

[Formula 12]

$$M_1 = (X_1, Y_1) = (-2, -4) \quad (12)$$

Figure 16C:
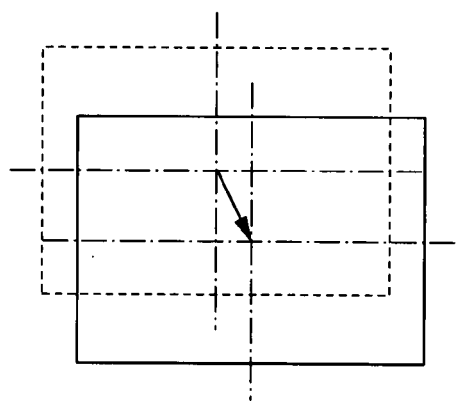
FIG. 16C is a view illustrating displacement of a fourth image to explain an average displacement.

FIG. 16C is a view illustrating displacement of the fourth image.

As shown in FIG. 16C, the fourth image is displaced by the amount of 1 in X-axis direction and by the amount of −3 in Y-axis direction, as expressed by the formula (13).

[Formula 13]

$$M_2 = (X_2, Y_2) = (1, -3) \quad (13)$$

Figure 16D:
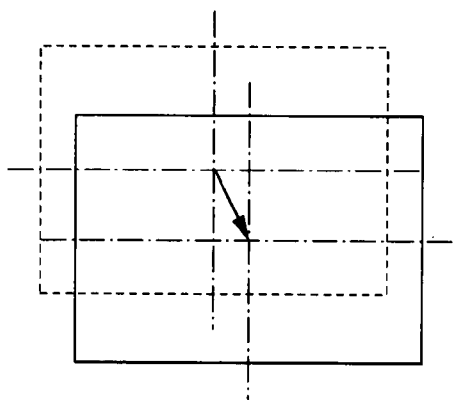
FIG. 16D is a view illustrating an average displacement.

FIG. 16D is a view illustrating average displacement of the four images.

Since the first image is not displaced, the average of displacement amounts of the remaining three images will be 1 in X-axis direction and −3 in Y-axis direction with reference to the first image, as expressed by the formula (14).

In short, as expressed by the formula (10), the combined image is seemed to be displaced by average displacement amounts respectively in X-axis direction and in Y-axis direction with reference to the first image.

[Formula 14]

$$M = ((4-2+1)/3, (-2-4-3)/3) = (1, -3) \quad (14)$$

Second Embodiment of the Invention

In general, brightness at an optical axis of the optical lens is used as reference brightness, and limb-darkening compensation is made with reference to such reference brightness. In average cameras, there is slight displacement between the optical axis of the lens and the center of a light receiving plane (image pick-up plane of the two-dimensional image sensor 31b). Therefore, common data cannot be compensated for correctly.

In the case if the displacement between the optical axis of the lens and the center of a light receiving plane is detected in each camera, each camera is used to take a picture with a complete light-diffusion plate provided thereon in uniform incident-light conditions, and the center of the picture is calculated from the picture data. This troublesome process can be bars in production line.

The second embodiment of the invention provides a method of calculating a limb-darkening compensation value common to individual cameras based on allowance of a positional difference in a camera module between the optical axis of the optical lens and the center of the light receiving unit mounted thereon.

Coordinates of a center point indicated by the optical axis of the optical lens installed on each camera are displaced on a camera to camera basis due to installing accuracy in a production line.

The allowance of the displacement of the optical axes of the optical lenses is previously determined in the quality control management, and the allowance is used as displacement of the optical axis of the optical lens.

Figure 8:
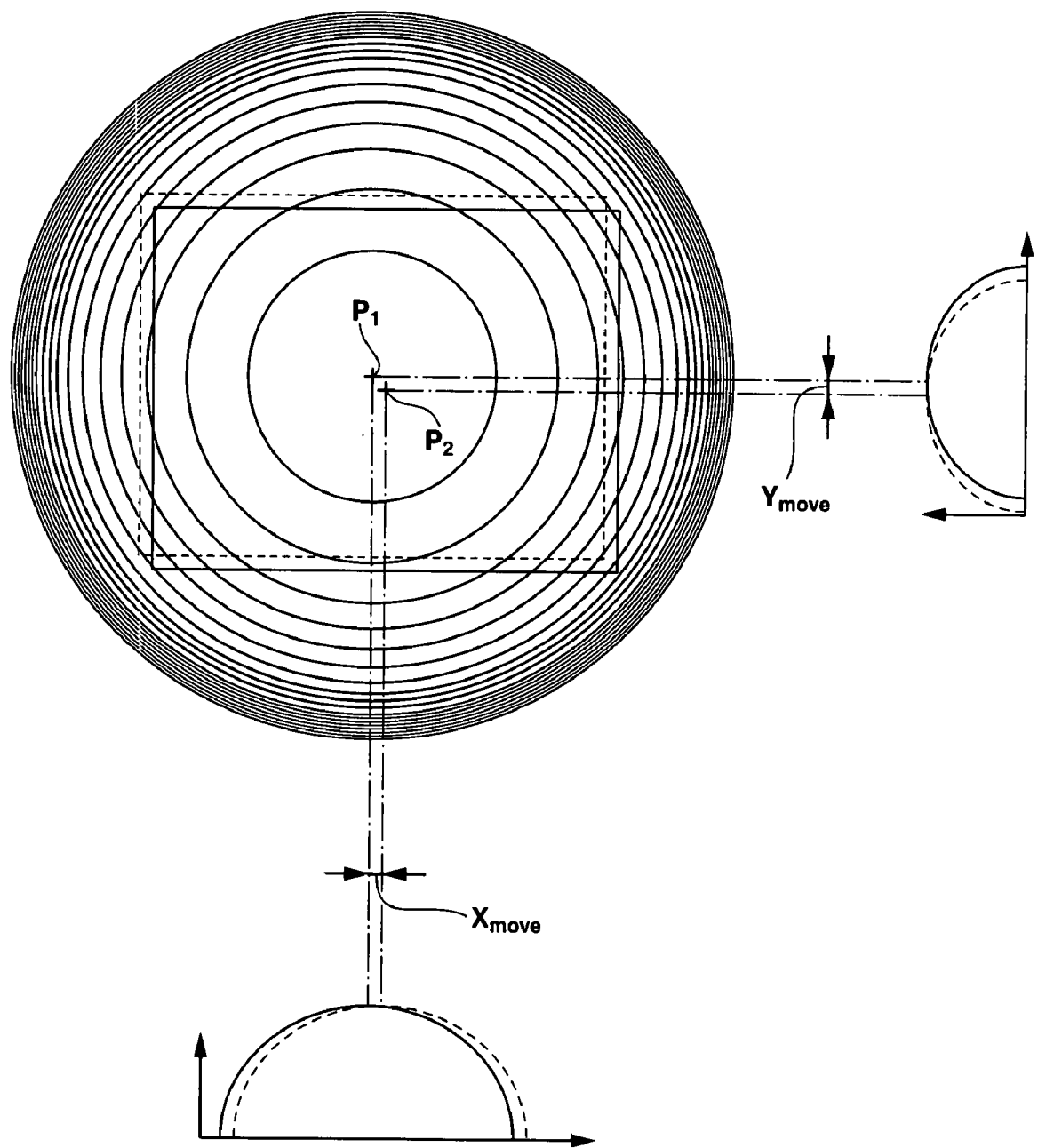
FIG. 8 is a view showing displacement between an optical lens and a light receiving unit.

FIG. 8 is a view showing displacement between the optical axis of the optical lens and the center of the light receiving unit.

As shown in FIG. 8, in the case where there is displacement between the center P1 indicated by the optical axis of the optical lens and the center P2 of the light receiving unit, the optical axis of image data is displaced by the same amount and in the same direction from the center P1 indicated by the optical axis of the optical lens.

Therefore, brightness distributions in images photographed with cameras with the optical axes displaced are widen as if the compensation curve is widen.

Figure 17:
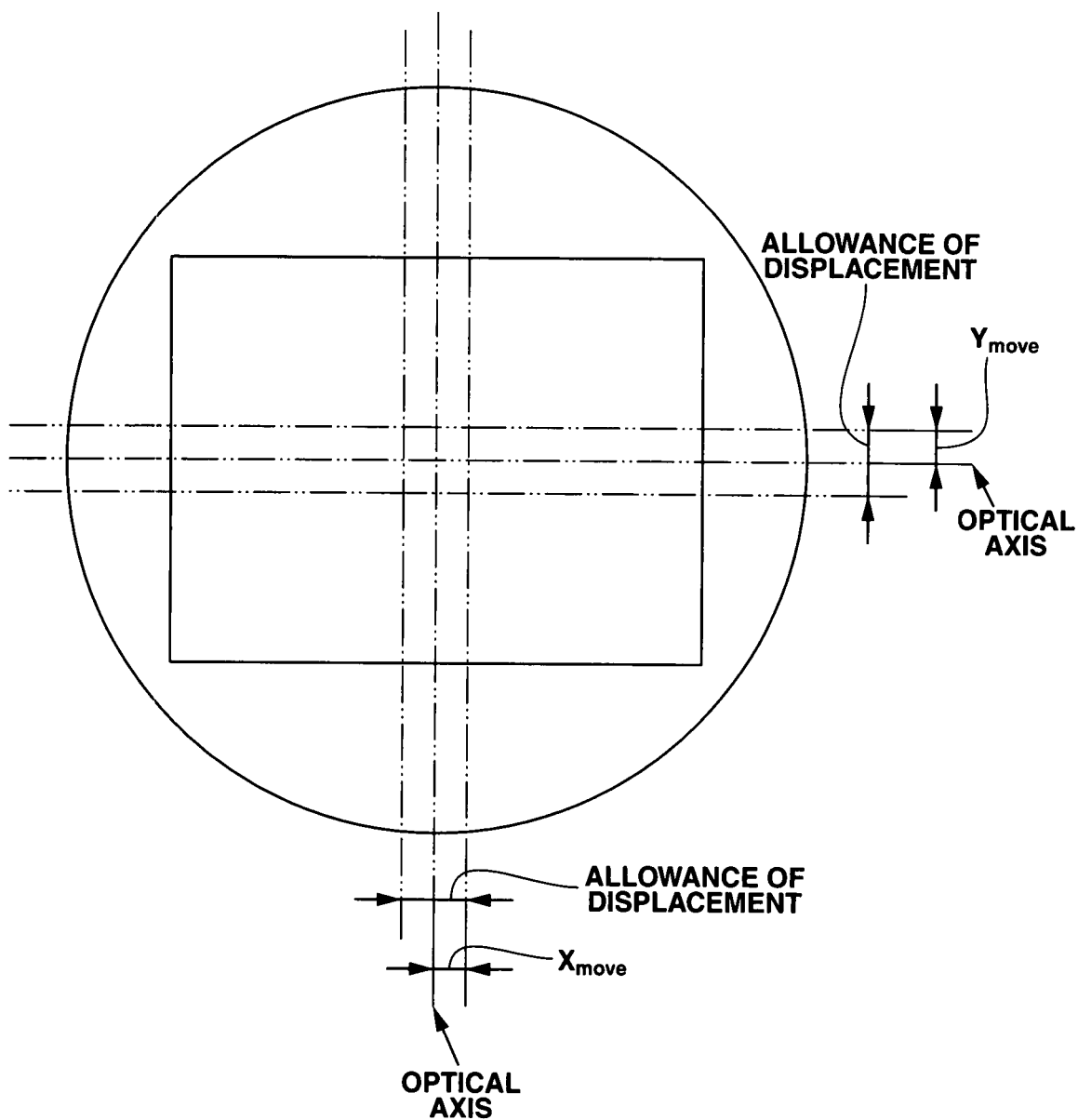
FIG. 17 is a view illustrating allowances and allowable ranges of displacement between an optical lens and a light receiving unit.

FIG. 17 is a view illustrating allowances and allowable ranges of displacement between the optical lens and light receiving unit.

On an X-Y plane, an ideal installing position of an image pick-up element in X-axis direction is determined at a point on X axis and also the ideal installing position of the image pick-up element in Y-axis direction is determined at a point on Y axis. Since limb darkening in an image is proportional to a distance form the optical axis of the image, the allowable range of displacement is set such that both in X-axis and Y-axis directions, the absolute value in positive sense becomes equivalent to the absolute value in negative sense. And the absolute value is used as the allowable value of the displacement.

In a similar manner to the first embodiment, substituting the allowable value of displacement to X-move and Y-move in the formula (4), the compensation coefficient "G" can be calculated on the basis of considerations of displacement between the optical lens and the light receiving unit. Therefore, regardless of the displacement between the optical lens and the light receiving unit, limb darkening in the image can be properly compensated.

X-move and Y-move are represented by the number of pixels. It is preferable to calculate the compensation coefficient "G" on the basis of considerations of displacement between the optical lens and the light receiving unit, for example, before photographing operation is performed by a user.

FIG. 9 is a flow chart of a process for making limb darkening compensation on the basis of considerations of displacement between the optical lens and the light receiving unit.

As shown in FIG. 9, the limb darkening compensation can be made on the basis of considerations of displacement between the optical lens and the light receiving unit at step S31, after a picture is photographed in a normal manner at step S30. In fact, since an allowance of the displacement of the camera module is determined in the specification of the camera, such allowance is substituted for X-move and Y-move in the formula (4) during the limb darkening compensation.

As described above, in the second embodiment of the invention, limb darkening compensating data or compensation calculating formula is generated based on the displacement between the optical lens and the light receiving unit. Therefore, the limb darkening compensation can be made without obtaining data unique to an individual camera, resulting in a simple production process of cameras.

Figure 18:
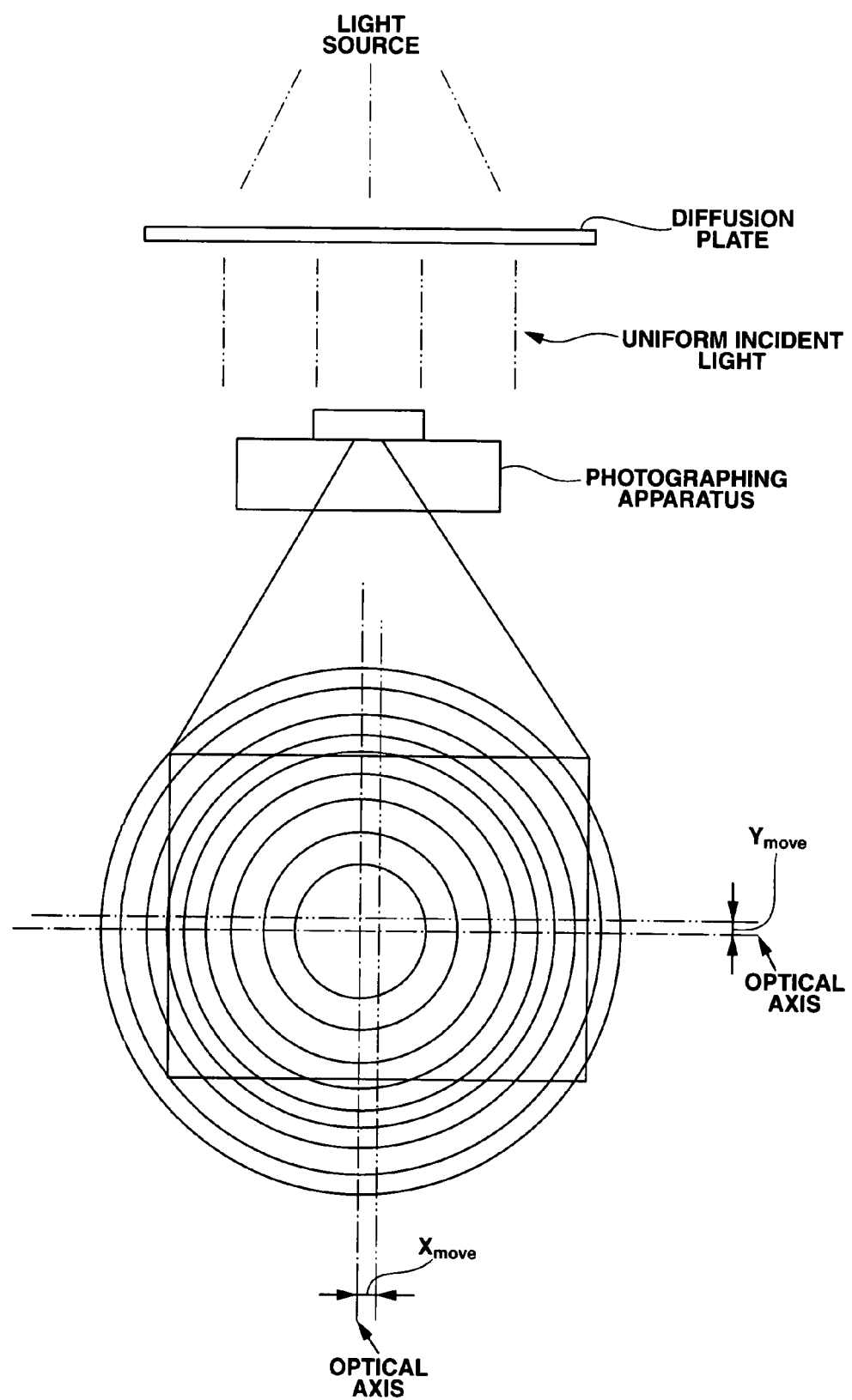
FIG. 18 is a view illustrating measurement of allowances of displacement between the optical lens and the light receiving unit.

In the second embodiment of the invention, the allowance of displacement of the camera module is determined as an allowance of displacement of the optical axis, but it is more preferable to measure displacement of the camera module from the photograph data which is produced under uniform incident light conditions as shown in FIG. 18.

FIG. 18 is a view illustrating uniform incident light being projected onto a photographing apparatus.

Light from a light source is projected through a diffusion plate onto the photographing apparatus whereby uniform incident light is projected onto the photographing apparatus.

Since uniform incident light is received whereby the limb darkening is correctly observed, the center of the limb darkening and a center of a photographed image are compared to measure X-move and Y-move.

X-move and Y-move are represented by the number of pixels. In this case, mean values of photograph data obtained in plural individuals can be used as X-move and Y-move.

Third Embodiment of the Invention

Figure 10A:
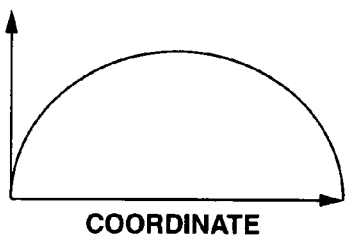
FIG. 10A is a view illustrating an idea of a digital zoom operation.
Figure 10B:
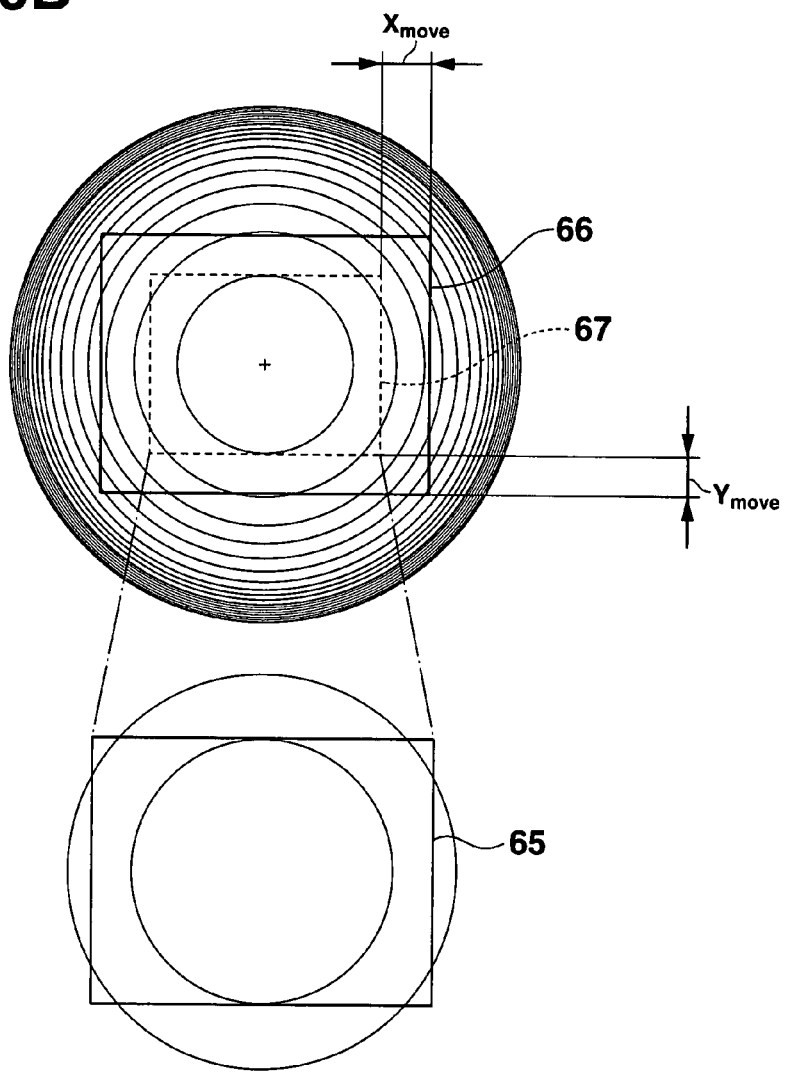
FIG. 10B is a view illustrating the idea of a digital zoom operation.
Figure 10C:
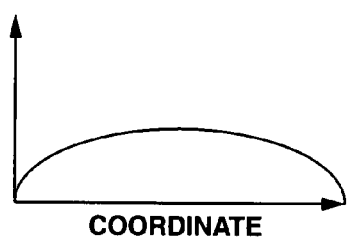
FIG. 10C is a view illustrating the idea of a digital zoom operation.

FIGS. 10A, 10B and 10C are views illustrating an idea of a digital zoom technique.

In the case of the digital zoom technique which enlarges a photographed image at an arbitrary enlarging ratio, the limb darkening effect is caused in photograph data 65 due to characteristics of an optical lens, and an available area is only a center portion 67 of an imaging area 66 of the two-dimensional image sensor.

If the limb darkening compensation is made in the enlarged photograph image 65, calculation is possible based on compensation values due to the optical lens, whereby compensation is made over an image in an area expanding wider than the available area (center portion 67 of the imaging area 66 of the two-dimensional image sensor). Therefore, such compensation is not effective.

It will be more effective to make compensation for limb darkening in an image limited to the available area (center portion 67 of the imaging area 66 of the two-dimensional image sensor).

If compensation is made for the limb darkening in the image without any modification, a similar level of compensation for the peripheral portion of the image would have been made also for the center portion of the image, whereby the center portion of the image would have been compensated for excessively.

In the fourth embodiment of the invention, there is provided a method of calculating a limb-darkening compensating value from an amount of an area (an area of the imaging area 66 with the center portion 67 removed in FIG. 10B) outside the field angle in a digital zoom mode.

Similarly to the first embodiment, substituting the area amount for X-move and Y-move in the formula (4) (refer to FIG. 10B), revision coefficients Rx, Ry appropriate for the digital zoom can be calculated.

Using the revision coefficients Rx, Ry, the limb darkening compensation is revised. When taking a picture, the user determines digital zoom ratio. Therefore, a revise value for limb darkening compensation must be determined after a picture is photographed.

Figure 11:
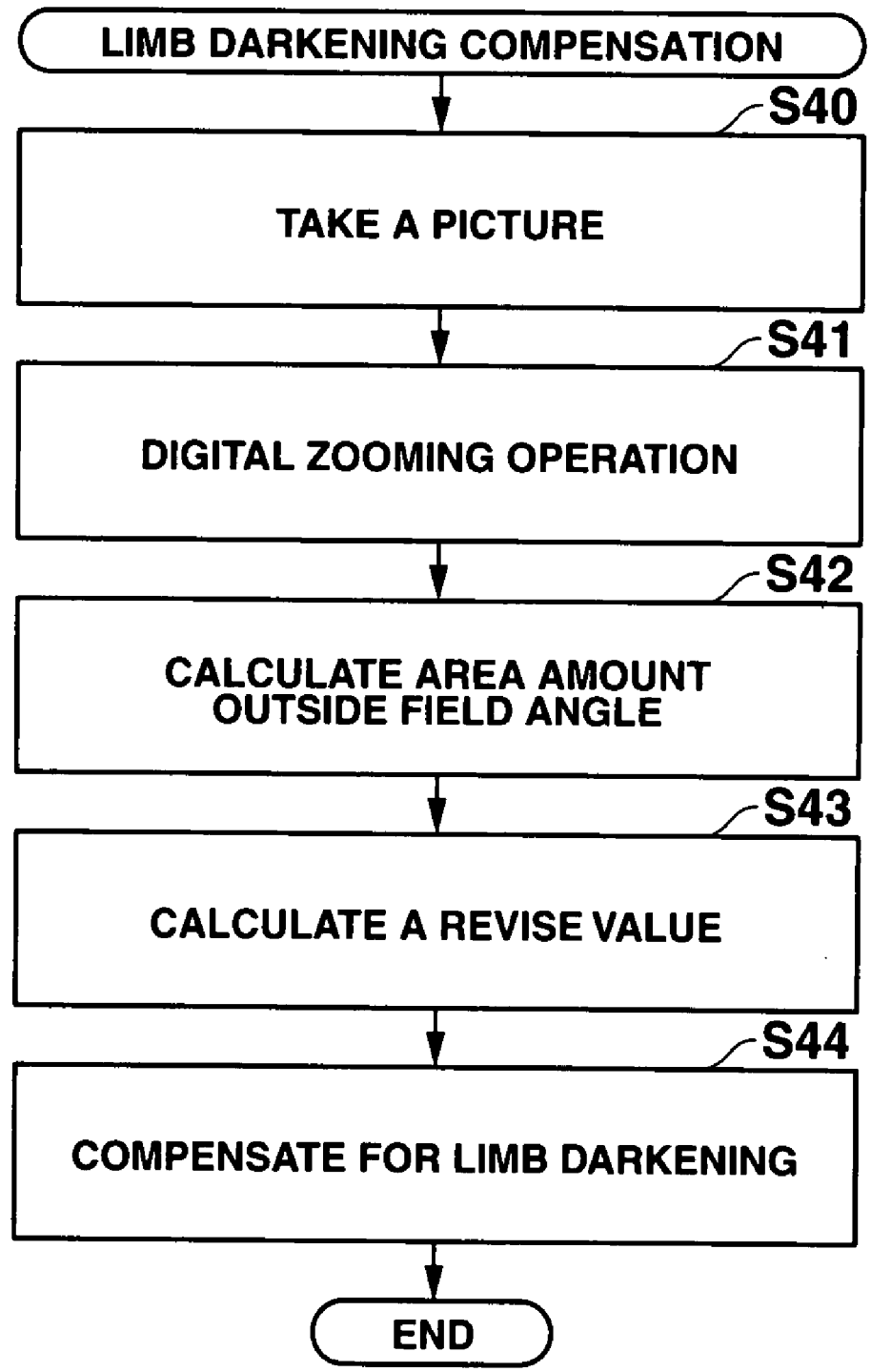
FIG. 11 is a flow chart of a limb-darkening compensation process in a digital zoom mode.

FIG. 11 is a flow chart of a limb-darkening compensation process in the digital zoom mode.

A picture is photographed in a normal mode at step S40. A digital zooming operation is performed at step S41 in accordance with the zoom ratio determined by the user. Since the digital zooming operation determines fixedly the amount of area brought outside the field angle, the revise value is calculated using the determined area amount at step S43. The limb darkening compensation is made based on the calculated revise value at step S44.

The above process is performed by substituting the "amount of area outside the field angle" for X-move and Y-move in the formula (4).

X-move and Y-move are represented by the number of pixels.

In the third embodiment of the invention, the limb darkening in the image is compensated for based on the limb darkening compensation revised for the area available in the digital zoom, whereby a time required for the compensation process is decreased.

What is claimed is:

1. An imaging apparatus comprising:
   a photographing unit having an optical system for photographing an object through the optical system to generate an image of the object;
   a combining unit for correcting displacement of plural images of the same object generated by the photographing unit and for combining the plural images whose displacement has been corrected, thereby generating a combined image; and
   a limb-darkening compensating unit for compensating for limb darkening in the combined image generated by the combining unit based on limb-darkening characteristics of the optical system;
   wherein the limb-darkening compensating unit: (i) calculates a limb-darkening characteristic component of each of the plural images, (ii) corrects positions of the limb-darkening characteristic components of the plural images to combine said limb-darkening characteristic components, thereby generating a limb-darkening characteristic compensation value, and (iii) compensates for limb darkening in the combined image using the limb-darkening characteristic compensation value.

2. The imaging apparatus according to claim 1, wherein the imaging apparatus further comprises:
a displacement correcting unit for calculating correction values for correcting displacement between the plural images generated by the photographing unit;
wherein the combining unit corrects displacement of the plural images generated by the photographing unit, using the correction values calculated by the displacement correcting unit.

3. The imaging apparatus according to claim 1, wherein the photographing unit photographs the object continuously plural times through the optical system to generate the plural images of the same object, the imaging apparatus further comprising:
a storing unit for storing the plural images of the same object generated by the photographing unit; and
a feature point calculating unit for calculating feature points of each of the plural images stored in the storing unit;
wherein the combining unit corrects the displacement of the plural images so as to make the calculated feature points of the plural images meet together, to combine the plural images, thereby generating the combined image.

4. The imaging apparatus according to claim 1, further comprising:
an adjusting unit for adjusting brightness of the combined image which has been subjected to limb-darkening compensation by the limb-darkening compensating unit.

5. The imaging apparatus according to claim 1, wherein the plural images generated by the photographing unit are images each on a plane having an X-direction and a Y-direction; and
wherein the limb-darkening compensating unit compensates for limb darkening in the combined image generated by the combining unit using a maximum displacement in displacements in the X-direction of centers of the plural images and a maximum displacement in displacements in the Y-direction of centers of the plural images, which are corrected by the combining unit to combine said plural images.

6. The imaging apparatus according to claim 1, wherein the plural images generated by the photographing unit are images a plane having an X-direction and a Y-direction; and
wherein the limb-darkening compensating unit compensates for limb darkening in the combined image generated by the combining unit using a mean value of displacements in the X-direction of centers of the plural images and a mean value of displacements in the Y-direction of centers of the plural images, which are corrected by the combining unit to combine said plural images.

7. The imaging apparatus according to claim 1, wherein the optical system of the photographing unit comprises an optical member and an imaging element having an image pick-up plane on a plane having an X-direction and a Y-direction; and
wherein the limb-darkening compensating unit compensates for limb darkening in the combined image using allowances of displacements respectively in the X-direction and in the Y-direction of the optical member from a correct position where said optical member should have been installed.

8. The imaging apparatus according to claim 1, wherein the optical system of the photographing unit comprises an optical member and an imaging element having an image pick-up plane on a plane having an X-direction and a Y-direction; and wherein the limb-darkening compensating unit compensates for limb darkening in the combined image using actually measured displacements respectively in the X-direction and the Y-direction of the optical member from a correct position where said optical member should have been installed.

9. The imaging apparatus according to claim 1, wherein the photographing unit has an image pick-up plane on a plane having an X-direction and a Y-direction, the imaging apparatus further comprising:
a field-angle changing unit for changing a field angle of the photographing unit to perform a digital zoom operation at an arbitrary field angle, wherein the limb-darkening compensating unit compensates for limb darkening, using a number of pixels aligned in the X-direction along a line passing through a center of the image and a number of pixels aligned in the Y-direction along a line passing through a center of the image and included in a portion of the image falling within an area defined by the field angle of the photographing unit except for an area defined by the field angle changed by the field-angle changing unit.

10. The imaging apparatus according to claim 4, wherein the adjusting unit adjusts brightness of the combined image which has been subjected to the limb-darkening compensation by the limb-darkening compensating unit, based on a number of pixels to be included in the combined image.

11. The imaging apparatus according to claim 4, further comprising:
an average brightness measuring unit for measuring brightness at centers of the plural images to calculate an average value of the measured brightness, wherein the adjusting unit adjusts brightness of the combined image which has been subjected to the limb-darkening compensation by the limb-darkening compensating unit, based on the average value of brightness at the centers of the plural images calculated by the brightness measuring unit.

12. The imaging apparatus according to claim 4, further comprising:
a frequency distribution calculating unit for calculating frequency distributions of the plural images, wherein the adjusting unit adjusts brightness of the combined image which has been subjected to the limb-darkening compensation by the limb-darkening compensating unit, such that said brightness is included within an effective range of the frequency distributions calculated by the frequency distribution calculating unit.

13. A method of photographing comprising:
photographing an object through an optical system to generate plural images of the object;
correcting displacement of the plural images to combine said plural images, thereby generating a combined image; and
compensating for limb darkening in the combined image based on limb-darkening characteristics of the optical system
wherein the compensating comprises: (i) calculating a limb-darkening characteristic component of each of the plural images, (ii) correcting positions of the limb-darkening characteristic components of the plural images to combine said limb-darkening characteristic components, thereby generating a limb-darkening characteristic compensation value, and (iii) performing the compensating for limb darkening in the combined image using the limb-darkening characteristic compensation value.

14. A non-transitory computer readable recording medium having a program stored thereon for controlling an imaging apparatus to perform functions including:

photographing an object through an optical system to generate plural images of the object;

correcting displacement of the plural images to combine said plural images, thereby generating a combined image; and compensating for limb darkening in the combined image based on limb-darkening characteristics of the optical system;

wherein the compensating comprises: (i) calculating a limb-darkening characteristic component of each of the plural images, (ii) correcting positions of the limb-darkening characteristic components of the plural images to combine said limb-darkening characteristic components, thereby generating a limb-darkening characteristic compensation value, and (iii) performing the compensating for limb darkening in the combined image using the limb-darkening characteristic compensation value.

* * * * *